(12) United States Patent
Sato et al.

(10) Patent No.: US 11,507,325 B2
(45) Date of Patent: Nov. 22, 2022

(54) STORAGE APPARATUS AND METHOD FOR MANAGEMENT PROCESS

(71) Applicant: HITACHI, LTD., Tokyo (JP)

(72) Inventors: Kenta Sato, Tokyo (JP); Kazuei Hironaka, Tokyo (JP); Akira Deguchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 50 days.

(21) Appl. No.: 17/190,145

(22) Filed: Mar. 2, 2021

(65) Prior Publication Data

US 2022/0091790 A1    Mar. 24, 2022

(30) Foreign Application Priority Data

Sep. 24, 2020   (JP) .............................. JP2020-160159

(51) Int. Cl.
      *G06F 3/06*          (2006.01)
(52) U.S. Cl.
      CPC ............ *G06F 3/0665* (2013.01); *G06F 3/067* (2013.01); *G06F 3/0613* (2013.01); *G06F 3/0653* (2013.01); *G06F 3/0683* (2013.01)
(58) Field of Classification Search
      CPC .... G06F 3/0665; G06F 3/0613; G06F 3/0653; G06F 3/067; G06F 3/083
      See application file for complete search history.

(56) References Cited

U.S. PATENT DOCUMENTS

| 10,404,555 | B2 * | 9/2019 | Wanser | ................ | H04L 41/0816 |
| 2008/0086469 | A1 * | 4/2008 | Gu | ....................... | G06F 11/3447 |
| 2011/0099268 | A1 * | 4/2011 | Ozaki | ................. | G06F 11/3495 |
| | | | | | 709/224 |
| 2015/0370627 | A1 * | 12/2015 | Nakajima | ........... | G06F 11/3409 |
| | | | | | 714/2 |
| 2019/0087181 | A1 | 3/2019 | Okada et al. | | |
| 2020/0344638 | A1 * | 10/2020 | Ding | ....................... | H04L 12/14 |

FOREIGN PATENT DOCUMENTS

JP            2019-053587 A         4/2019

* cited by examiner

*Primary Examiner* — Eric Cardwell
(74) *Attorney, Agent, or Firm* — Volpe Koenig

(57) ABSTRACT

A storage apparatus includes a processor and a memory. The processor provides a plurality of logical volumes each allowing input and output of data, and processes each data input to and output from a storage device via the logical volume. The processor acquires operational data associated with each of the plurality of logical volumes, and transmits the acquired operational data to a source of a operational data request. The processor adjusts, for each of the logical volumes, accuracy of the operational data to be acquired from each of the logical volumes, according to a status of each of the logical volumes.

11 Claims, 20 Drawing Sheets

FIG. 5

| HOST ID | FE PORT ID | PROTOCOL | WWN | IQN |
|---|---|---|---|---|
| 0 | 0 | FC | abcd012345fedcba | - |
| 1 | 1 | iSCSI | - | iqn.2020-01.com.example:aabbcc |
| 2 | 0 | FC | abcd2345670fedcb | - |
| 3 | 0 | FC | dcba345432ccbbaa | - |
| 4 | 1 | iSCSI | - | iqn.2020-01.com.example2:bbccdd |
| ... | ... | ... | ... | ... |

| HOST ID (4121) | LOGICAL VOLUME ID (4111) | LUN (4131) | ... |
|---|---|---|---|
| 0 | 3 | 0 | ... |
| 1 | 0 | 0 | ... |
| 1 | 2 | 1 | ... |
| 2 | 4 | 0 | ... |
| 3 | 5 | 0 | ... |
| 4 | 4 | 0 | ... |
| 4 | 6 | 1 | ... |
| ... | ... | ... | ... |

FIG. 8

| LOGICAL VOLUME ID 4111 | CPU USAGE RATE 4221 | CONNECTED HOST NUMBER 4222 | USAGE CAPACITY 4223 | IOPS 4224 | RESPONSE 4225 | TRANSFER SPEED 4226 | ... |
|---|---|---|---|---|---|---|---|
| 0 | 3% | 1 | 90GB | 15k IOPS | 1.4ms | 63 MB/s | ... |
| 1 | 0% | 0 | 390GB | 0 kIOPS | - | 0 MB/s | ... |
| 2 | 10% | 1 | 100GB | 15 kIOPS | 3.5ms | 84 MB/s | ... |
| 3 | 25% | 1 | 800GB | 70 kIOPS | 2ms | 120 MB/s | ... |
| 4 | 12% | 1 | 400GB | 30 kIOPS | 1.9ms | 72 MB/s | ... |
| 5 | 6% | 1 | 300GB | 25 kIOPS | 1.8ms | 35 MB/s | ... |
| 6 | 14% | 1 | 500GB | 40k IOPS | 3ms | 80 MB/s | ... |
| 7 | 0% | 0 | 200GB | 0 kIOPS | - | 0 MB/s | ... |
| ... | ... | ... | ... | ... | ... | ... | ... |

FIG. 9

| LOGICAL VOLUME ID 4111 | CPU USAGE RATE 4221 | CONNECTED HOST NUMBER 4222 | USAGE CAPACITY 4223 | IOPS 4224 | ... | TIME STAMP 5111 |
|---|---|---|---|---|---|---|
| 0 | 3% | 1 | 90GB | 15k IOPS | ... | 18:23:53 |
| 1 | 0% | 0 | 390GB | 0 kIOPS | ... | 18:20:00 |
| 2 | 10% | 1 | 100GB | 15 kIOPS | ... | 18:23:53 |
| 3 | 25% | 1 | 800GB | 70 kIOPS | ... | 18:23:53 |
| 4 | 12% | 1 | 400GB | 30 kIOPS | ... | 18:23:53 |
| 5 | 6% | 1 | 300GB | 25 kIOPS | ... | 18:20:00 |
| 6 | 14% | 1 | 500GB | 40k IOPS | ... | 18:23:53 |
| 7 | 0% | 0 | 200GB | 0 kIOPS | ... | 18:20:00 |
| ... | ... | ... | ... | ... | ... | ... |

STORAGE APPARATUS AND METHOD FOR MANAGEMENT PROCESS

BACKGROUND OF THE INVENTION

1. Field of the Invention

The present disclosure relates to a storage apparatus and a method for a management process.

2. Description of the Related Art

In recent years, a state of a storage apparatus is typically monitored using an external analysis system. Accordingly, the storage apparatus is required to transfer operational data, such as a central processing unit (CPU) usage rate, and an input/output per second (IOPS) of the apparatus, to the analysis system efficiently at a high speed.

Disclosed in JP-2019-53587-A is a storage apparatus that efficiently executes a management process while reducing influence of an input-output (IO) process produced by the management process. The storage apparatus of JP-2019-53587-A includes a management processor and a plurality of main processors. The management processor selects the main processor to which a management instruction is to be given next, on the basis of progress of management instructions already transmitted to the plurality of main processors. In this manner, an efficient management process is executable.

In recent years, a storage apparatus which performs functions of performance anomaly detection, health check, failure prediction, performance trend analysis, capacity trend analysis, and the like by using an artificial intelligence (AI) technology, such as deep learning, has increasingly been adopted for the purpose of labor saving of operation management of the storage apparatus.

Normally, for achieving sophisticated analysis using an AI technology, a large volume of learning data is prepared and learned, and the analysis is performed using a learning result. In this case, a large volume of learning data is required for the analysis. Thus, such intelligent functions are usually performed by using learning data which is generated from operational data collected from a large number of storage apparatuses, rather than from a single storage apparatus.

Moreover, such learning and analysis require a large volume of calculation resources. Accordingly, often used is a configuration which prepares an analysis system provided in a cloud for performing learning and analysis of operational data. For achieving learning and analysis by using an analysis system operating outside the storage apparatus, such as in a cloud, the storage apparatus is required to transfer own operational data to the analysis system at a high speed, high frequency, and equal intervals.

However, storage resources provided for a user from the storage apparatus, such as the number of volumes, generally increase with an elapse of time. As a result, the data volume of operational data required to be transferred at a time from the storage apparatus to the analysis system increases in association with the increase in the storage resources provided for the user. For analyzing such time series data as operational data, data collected at equal intervals is typically used. However, it is difficult to transfer operational data at a high speed, high frequency, and equal intervals from the storage apparatus to the analysis system, when the data volume of the operational data increases.

A time required for transmitting a certain fixed data volume of the operational data can be reduced by using the technology disclosed in JP-2019-53587-A. However, when the data volume itself of the operational data increases, the transfer time becomes longer in proportion to the increase in the data volume.

As described above, for analyzing such time series data as operational data, data is normally assumed to be collected at equal intervals. Unequal intervals of monitoring may complicate analysis, and lower accuracy and quality of the analysis.

For equalizing intervals of a monitoring cycle, for example, it is considered setting a operational data transfer interval itself to a longer time covering a worst time required for the transfer, on an assumption of an increase in the data volume. In this case, however, a small change in a operational state which appears only for a short period of time in the analysis is difficult to detect. As a result, accuracy and quality of the analysis may be lowered.

SUMMARY OF THE INVENTION

One object of the present disclosure is to provide a technology which reduces data volume while securing accuracy of operational data to be transferred from a storage apparatus to an analysis system.

A storage apparatus according to the present disclosure is directed to a storage apparatus including a processor and a memory. The processor provides a plurality of logical volumes each allowing input and output of data, and processes each data input to and output from a storage device via the logical volume. The processor acquires operational data associated with each of the plurality of logical volumes, and transmits the acquired operational data to a source of a operational data request. The processor adjusts, for each of the logical volumes, accuracy of the operational data to be acquired from each of the logical volumes, according to a status of each of the logical volumes.

According to the present disclosure, reduction of data volume is achievable while accuracy of operational data to be transferred from a storage apparatus to an analysis system is secured.

BRIEF DESCRIPTION OF THE DRAWINGS

FIG. 5 is a diagram depicting a configuration example of a host management table according to the first embodiment;

FIG. 6 is a diagram depicting a configuration example of an IO path management table according to the first embodiment;

FIG. 8 is a diagram depicting a configuration example of a logical volume operational data table according to the first embodiment;

FIG. 9 is a diagram depicting a configuration example of a logical volume operational data cache table according to the first embodiment;

DESCRIPTION OF THE PREFERRED EMBODIMENTS

Embodiments according to the present invention will hereinafter be described with reference to the drawings. Note that the following description and drawings are presented only by way of example for explaining the present invention. Accordingly, omission and simplification are made where appropriate for clarification of the description, and the technical scope of the present invention is not limited to the following description and drawings.

In the following description, various types of information will be expressed as a "table," a "chart," a "list," a "queue," or the like in some cases. However, each of the various types of information may be expressed as a data structure other than these. The "table," the "chart," the "list," the "queue," or the like will be simply referred to as "information" in some cases to indicate that these are not dependent on a data structure. Moreover, information expressed as one data structure may be divided into two or more data structures. Furthermore, information expressed as two or more data structures may be combined into one data structure. Expressions such as "identification information," an "identifier," a "name," an "appellation," "identification (ID)," and a "number" will be used in some cases for explaining contents of various types of information. These expressions are replaceable with each other.

In the following description, an explanation including a "program" as a subject of a sentence may be replaced with an explanation including a "processor" as the subject. This replacement is allowed on the basis of the fact that the processor (e.g., CPU and/or graphics processing unit (GPU)) achieves processes defined under a program by executing the program while operating in cooperation with a storage resource (e.g., memory) and/or an interface device (e.g., communication device). An entity executing the program may be a controller, a device, a system, a calculator, a node, a storage apparatus, a server, a client, or a host, each including a processor. Moreover, a part or all of the processes defined under the program may be achieved using a hardware circuit.

Various types of programs may be installed in respective calculators via a program distribution server or a storage medium. Furthermore, in the following description, two or more programs may be implemented as one program, or one program may be implemented as two or more programs.

First Embodiment

A first embodiment according to the present invention will hereinafter be described with reference to FIGS. 1 to 17.

Figure 1:
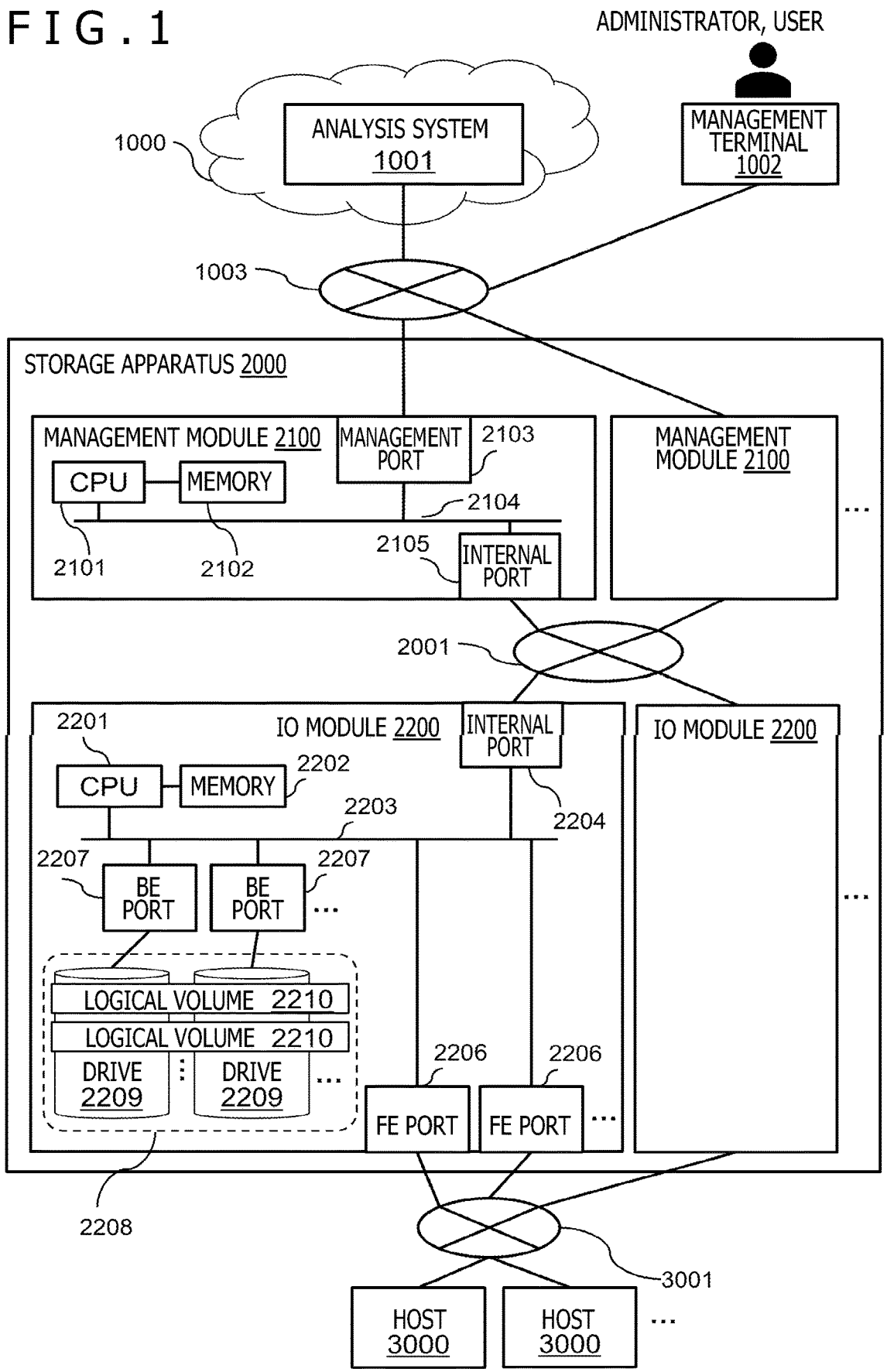
FIG. 1 is a diagram depicting a configuration example of a storage system according to a first embodiment.

FIG. 1 is a diagram depicting a configuration example of a storage system according to the first embodiment. The storage system includes a storage apparatus 2000, at least one host 3000, an analysis system 1001, and at least one management terminal 1002.

The storage apparatus 2000, the analysis system 1001, and the management terminal 1002 are connected to an external network 1003, and are allowed to mutually communicate with each other via the external network 1003. The external network 1003 includes any of communication lines such as an optical fiber, a long term evolution (LTE), a fifth generation mobile communication system (5G), and a wireless local area network (LAN), or a combination of these.

The analysis system 1001 collects operational data 4200 (see FIG. 2) from the storage apparatus 2000, and analyzes the collected operational data 4200. A administrator (or user) of the storage system may manage operation of the storage apparatus 2000 by using an analysis result thus obtained. The analysis system 1001 operates in a cloud 1000 prepared by a vender of the storage apparatus 2000. The analysis system 1001 regularly issues an acquisition request for acquiring the operational data 4200 to the storage apparatus 2000 via the external network 1003, and analyzes the operational data 4200 transferred from the storage apparatus 2000. Examples of the analysis include performance anomaly detection, health check, failure prediction, performance trend analysis, and capacity trend analysis of the storage apparatus 2000. However, the analysis achieved by the analysis system 1001 is not limited to these examples, and may be any analysis.

The analysis system 1001 may achieve the analysis using an AI technology such as deep learning and regression analysis, or may achieve the analysis by performing a statistical process or simple conditional branching. Moreover, the analysis system 1001 may use the operational data 4200 collected from a plurality of storage apparatuses covering a plurality of customers other than the storage apparatus 2000, as learning data for analysis using the AT technology.

Note that the configuration where the analysis system 1001 operates in the cloud 1000 prepared by the vendor according to the present embodiment is presented by way of example. The operation of the analysis system 1001 is not limited to the operation performed in the cloud 1000. For example, the analysis system 1001 operates in the private cloud 1000 or a server device prepared by a customer, and achieves analysis by using the operational data 4200 provided from the storage apparatus 2000 owned by the customer.

The management terminal 1002 is a device operated by the administrator (or user) of the storage system to operate the storage apparatus 2000. For example, the management terminal 1002 is a laptop computer, a tablet-type terminal, a smartphone, or the like.

Management software for managing the storage apparatus 2000 is installed in the management terminal 1002. The administrator (or user) of the storage system communicates with the storage apparatus 2000 and/or the analysis system 1001 via the management software to transmit an operation request for configuration setting to the storage apparatus 2000, monitor normality of the operation of the storage apparatus 2000, and check an analysis result. The management software may be a web application operating as a part of the analysis system 1001 or the storage apparatus 2000. In this case, the administrator (or user) of the storage system accesses the web application from a web browser installed in the management terminal 1002, and carries out various types of maintenance and management such as configuration setting, monitoring, and analysis result checking of the storage apparatus 2000.

The host 3000 is a computer which executes installed application programs to perform various types of transactions. The host 3000 transmits a data reading request or a data writing request to the storage apparatus 2000 in response to a request from a running application program.

As depicted in FIG. 1, the host 3000 is connected to the storage apparatus 2000 via a storage network 3001. The storage network 3001 may include a storage area network (SAN) using a Fibre Channel (FC). Alternatively, the storage network 3001 may include internet small computer system interface (iSCSI), SCSI remote direct memory access (RDMA) protocol (SRP), or non-volatile memory express over fabrics (NVMeoF) using Ethernet, InfiniBand, or the like.

The storage apparatus 2000 is an apparatus which provides a storage area for data reading and writing for the host 3000, and includes at least one management module 2100 and at least one IO module 2200. The management module 2100 may also be referred to as a management processing unit. The IO module 2200 may also be referred to as an input/output processing unit.

The management module 2100 and the IO module 2200 are connected to each other inside the storage apparatus 2000 via an internal network 2001. The internal network 2001 may include Ethernet, peripheral component interconnect (PCI) Express, or InfiniBand. Alternatively, the internal network 2001 may include a proprietary interconnection such as Intel Ultra Path Interconnect (UPI) and Infinity Fabric (IF).

Note that a case where the one management module 2100 and the one IO module 2200 are provided will be described in the present specification for simplification of the description unless otherwise specified. In a case where a plurality of the management modules 2100 and a plurality of the IO modules 2200 are provided, note that redundancy, load balancing, and/or data sharing, for example, may appropriately be conducted between a plurality of modules using known means.

The management module 2100 is a module which relays, to the IO module 2200, a configuration setting operation request or an information acquisition request issued from the management terminal 1002 and the analysis system 1001 via the external network 1003, in a case of reception of the configuration setting operation request or the information acquisition request.

The management module 2100 includes at least one CPU 2101, at least one memory 2102, at least one management port 2103, and at least one internal port 2105. These constituent elements are connected to an internal bus 2104 which allows bidirectional communication.

The CPU 2101 is a control device which handles operation control of the management module 2100, and achieves various types of processing by executing various types of programs stored in the memory 2102.

The memory 2102 stores information associated with control of the management module 2100 and various types of programs. The memory 2102 further stores a part of information acquired from the IO module 2200, as a cache. The memory 2102 may include a dynamic random access memory (DRAM).

Alternatively, the memory 2102 may include a storage medium such as a magnetoresistive RAM (MRAM), a resistive RAM (ReRAM), and a phase change memory (PCM).

The management port 2103 is a network interface provided for communication with a storage management component. The storage management component operates in the analysis system 1001 or the management terminal 1002 which is an example of a device outside the storage apparatus 2000. The management port 2103 may include a network interface card (NIC) complying with Ethernet. Alternatively, the management port 2103 may include any network interface device in conformity with a communication standard of the external network 1003 described above.

The internal port 2105 is a network interface provided for communication with the IO module 2200 or a different management module 2100. The internal port 2105 includes a network interface in conformity with a communication standard of the internal network 2001.

While not depicted in FIG. 1, the storage apparatus 2000 may include a non-volatile storage device for storing operating system (OS) images, operation logs, and the like of the management module 2100. For example, the non-volatile storage device is a hard disk drive (HDD), a solid state drive (SSD), an embedded multi media card (eMMC), or the like.

The management module 2100 may simply relay received various types of requests. Alternatively, the management module 2100 may execute any processing for relaying received various types of requests. For example, the management module 2100 may convert each of received various types of requests into at least one internal request to be used inside the storage apparatus 2000, or convert a structure of response data. Moreover, in such a case where a plurality of relay destination candidates are present as a case where the two or more IO modules 2200 are present, the management module 2100 may select a relay destination by using a round robin, or by using the technology disclosed in JP-2019-53587-A.

The IO module 2200 is a module which processes a data reading request and a data writing request transmitted from the host 3000, to input and output the data to and from the storage apparatus 2000. The IO module 2200 includes at least one CPU 2201, at least one memory 2202, at least one internal port 2204, at least one back-end (BE) port 2207, at least one front-end (FE) port 2206, and at least one drive 2209. The CPU 2201, the internal port 2204, the BE port 2207, and the FE port 2206 are connected to an internal bus 2203 which allows bidirectional communication.

The CPU 2201 is a control device which handles operation control of the corresponding IO module 2200, and achieves various types of processing by executing various types of programs stored in the memory 2202.

The memory 2202 information associated with control of the IO module 2200 and stores various types of programs. The memory 2202 further stores a part of information acquired from the IO module 2200, as a cache. The memory 2202 may include a DRAM. Alternatively, the memory 2202 may include a storage medium such as an MRAM, a ReRAM, and a PCM.

The internal port 2204 is a network interface provided for communication with the management module 2100 and a different IO module 2200. The internal port 2204 includes a network interface in conformity with a communication standard of the internal network 2001. While FIG. 1 depicts an example where the storage apparatus 2000 includes the one internal network 2001, the storage apparatus 2000 may further include the internal port 2204 and the internal network 2001 dedicated for communication between the IO modules 2200. In this case, the communication standard for communication between the JO modules 2200 may be different from the communication standard for communication between the JO module 2200 and the management module 2100.

The FE port 2206 is a network interface for connecting the JO module 2200 with the storage network 3001 and the host 3000. The FE port 2206 includes a network interface in conformity with a communication standard of the storage network 3001.

The drive 2209 is a device which has a physical storage area, and is constituted by a non-volatile storage device such as an HDD, an SSD, a storage class memory (SCM), and an optical disk. The drive 2209 is connected to the BE port 2207 via an interface such as a serial attached SCSI (SAS), serial advanced technology attachment (SATA), and NVMe. While not depicted in the figure, the BE ports 2207 of a plurality of the IO modules 2200 may be connected to the one drive 2209.

The logical volume 2210 is a storage area formed in the storage apparatus 2000 and provided for the host 3000, and stores data written from the host 3000. The logical volume 2210 itself does not have a physical storage area. Data written by the host 3000 for the logical volume 2210 is written into the drive 2209. At this time, conversion between an address indicating a data position in the logical volume 2210 (logical block address) and an address indicating a data position in the drive 2209 is carried out. For handling a data reading request from the host 3000, data is read from the drive 2209 or a redundant arrays of independent disks (RAID) group after address conversion and is then transferred to the host 3000 similarly to data writing.

Note that the IO module 2200 may be configured to write data to a RAID group including a plurality of the bundled drives 2209 using a highly reliable technology such as RAID as depicted in FIG. 1, rather than simply writing data to the drive 2209. Furthermore, the IO module 2200 may have such functions as a thin provisioning function which allocates a physical storage area to a region where IO has occurred, a data compression function which compresses data written from the host 3000 and then stores the compressed data in the drive 2209, and a duplication removal function which detects and removes data duplicated in the storage apparatus 2000.

In addition to the functions described above, the storage apparatus 2000 may have other known functions as functions performed in a case where a data writing request or a data reading request is issued from the host 3000. Description of a processing flow and a data structure associated with the foregoing data input/output processing will hereinafter be omitted in some cases. It is assumed, however, that the storage apparatus 2000 is configured to appropriately perform the omitted part of the data input/output processing.

Besides, while not depicted in the figure, the IO module 2200 may include a non-volatile storage device for storing OS images, operation logs, and the like. For example, the non-volatile storage device is an HDD, an SSD, an eMMC, or the like.

Note that, at least one of the host 3000, the management module 2100, and the IO module 2200 is not limited to a physical component, and may be constituted using a virtualization technology such as a virtual machine and a container, for example. Moreover, each of the host 3000, the management module 2100, and the IO module 2200 may be virtualized by a virtualization technology and constituted in one physical apparatus. In this case, a virtual switch may be used as the internal network 2001.

Figure 2:
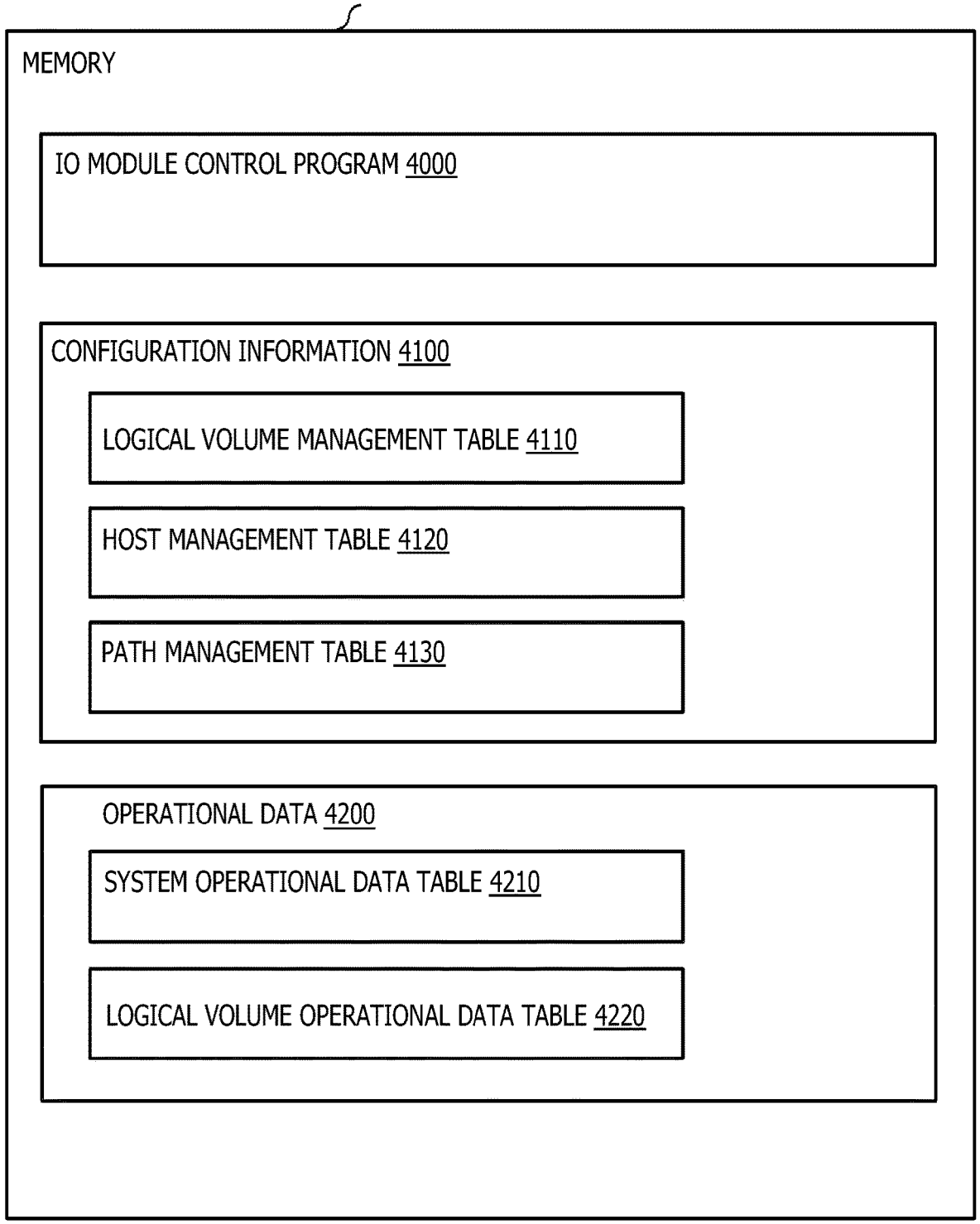
FIG. 2 is a diagram depicting a configuration example of a memory of an IO module according to the first embodiment.

FIG. 2 is a diagram depicting an IO module control program 4000, configuration information 4100, and operational data 4200 each stored in the memory 2202 of the IO module 2200 according to the present embodiment. While not depicted in FIG. 2, the memory 2202 may further store a cache of the configuration information 4100, a cache of the operational data 4200, various types of data, and the like.

The IO module control program 4000 is a program for controlling the IO module 2200. The IO module control program 4000 performs the above-described processing in response to a data reading request and a data writing request issued from the host 3000. In addition, the IO module control program 4000 performs such processes as a process for transferring the configuration information 4100 and/or the operational data 4200 stored in the memory 2202, a process for creating the logical volume 2210, and a process for allocating the logical volume 2210 to the host 3000, in response to a request from the management module 2100.

The configuration information 4100 is information associated with management of the logical volume 2210 and a connection relation between the logical volume 2210 and the host 3000. The configuration information 4100 includes a logical volume management table 4110, a host management table 4120, and a path management table 4130. The logical volume management table 4110 is a table for management of information associated with definition management of each of the logical volumes 2210, such as ID and a capacity. The host management table 4120 is a table for management of information associated with connection and communication between the storage apparatus 2000 and the host 3000, such as ID, a connection protocol, and a world wide name (WWN) of the FE port 2206 to which the host 3000 is connected. The path management table 4130 is a table for management of a correspondence between the one host 3000 and the logical volume 2210 allocated to the corresponding host 3000.

For example, the administrator (or user) of the storage system instructs the storage apparatus 2000 to perform such operations as creation and removal of the logical volume 2210, registration and cancellation of the host 3000, and allocation of the logical volume 2210 to the host 3000 and cancellation thereof, via the management terminal 1002. The IO module control program 4000 of the IO module 2200 receives the instruction via the management module 2100, and adds, removes, and changes an entry as necessary to create the configuration information 4100 while performing appropriate processing. For example, the administrator (or user) of the storage system issues a reference request to the storage apparatus 2000 via the management terminal 1002. The IO module control program 4000 of the IO module 2200 receives the reference instruction via the management module 2100, and transfers requested information to the source of the request.

The operational data 4200 is information indicating a running status of the IO module 2200, such as a CPU usage rate, an IOPS, and a transfer speed. The operational data 4200 includes a system operational data table 4210 and a logical volume operational data table 4220. The IO module control program 4000 updates the operational data 4200 at an appropriate timing, such as every fixed time or a timing at which a data reading request or a data writing request is issued from the host 3000. The system operational data table 4210 is a table which stores the operational data 4200 associated with the entire IO module 2200. The logical volume operational data table 4220 is a table which stores the operational data 4200 associated with each of the logical volumes 2210. While not depicted in the figure, the memory 2202 may store a table which stores the operational data 4200 associated with respective components, such as the host 3000, the drive 2209, the FE port 2206, the BE port 2207, and the internal port 2204.

Figure 3:
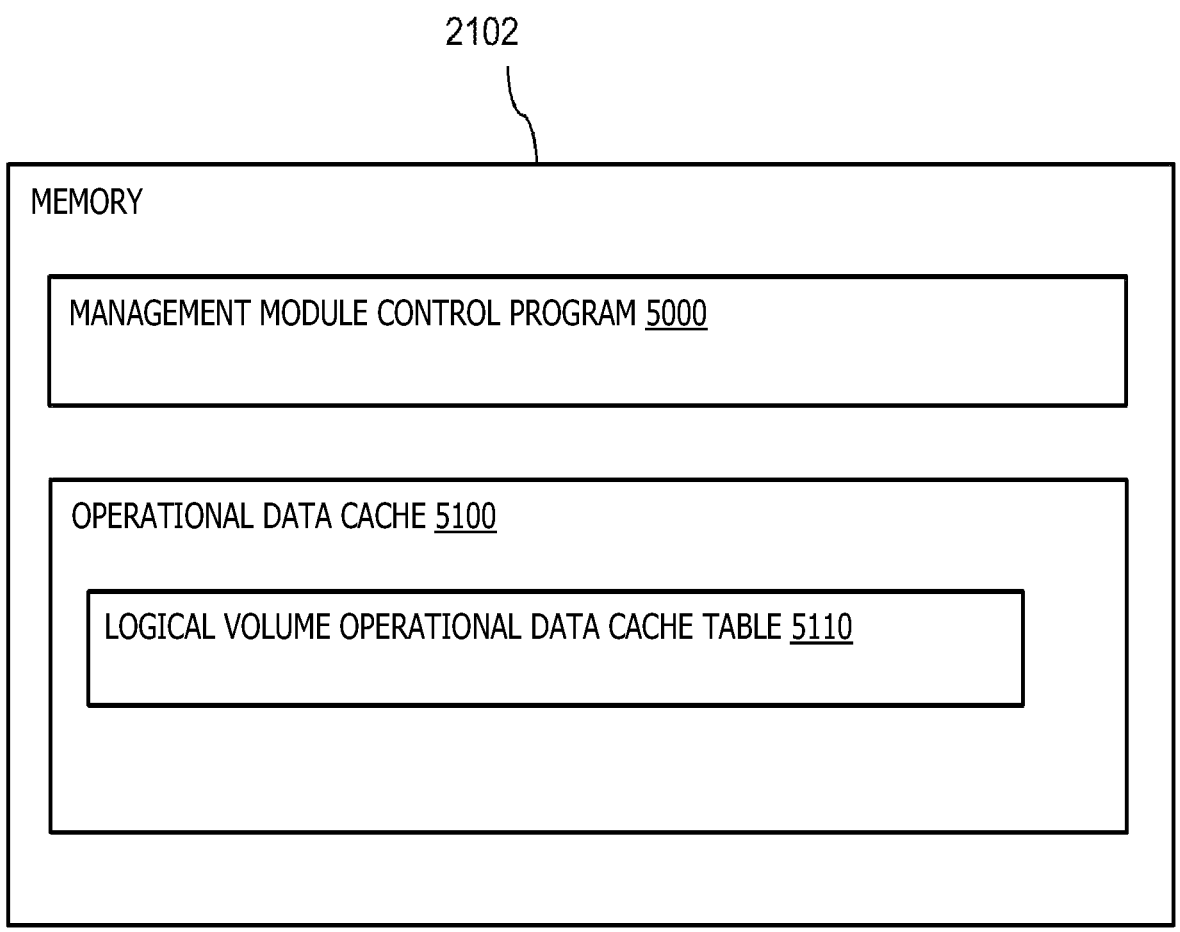
FIG. 3 is a diagram depicting a configuration example of a memory of a management module according to the first embodiment.

FIG. 3 is a diagram depicting a management module control program 5000 and a operational data cache 5100 stored in the memory 2102 of the management module 2100 according to the present embodiment. While not depicted in FIG. 3, the memory 2102 may further store a cache of the configuration information 4100, a cache of the operational data 4200, various types of data, and the like.

The management module control program 5000 is a program for controlling the management module 2100. The management module control program 5000 performs, in response to a request from the management terminal 1002 or the analysis system 1001, the above-mentioned processes such as a process for issuing an operation instruction of configuration setting to the IO module 2200, and a process for acquiring and processing necessary information from the memory 2202 of the IO module 2200 to transfer the processed information to the source of the request.

The operational data cache 5100 is a cache of a part or all of the operational data 4200 stored in the memory 2202 of the IO module 2200. FIG. 3 depicts the logical volume operational data cache table 5110 which caches the operational data 4200 associated with the logical volume 2210 which generally has the largest data volume, as a cache target. However, the cache target may be other types of the operational data 4200.

Management information for controlling the storage apparatus 2000 according to the present embodiment will be described below.

Figure 4:
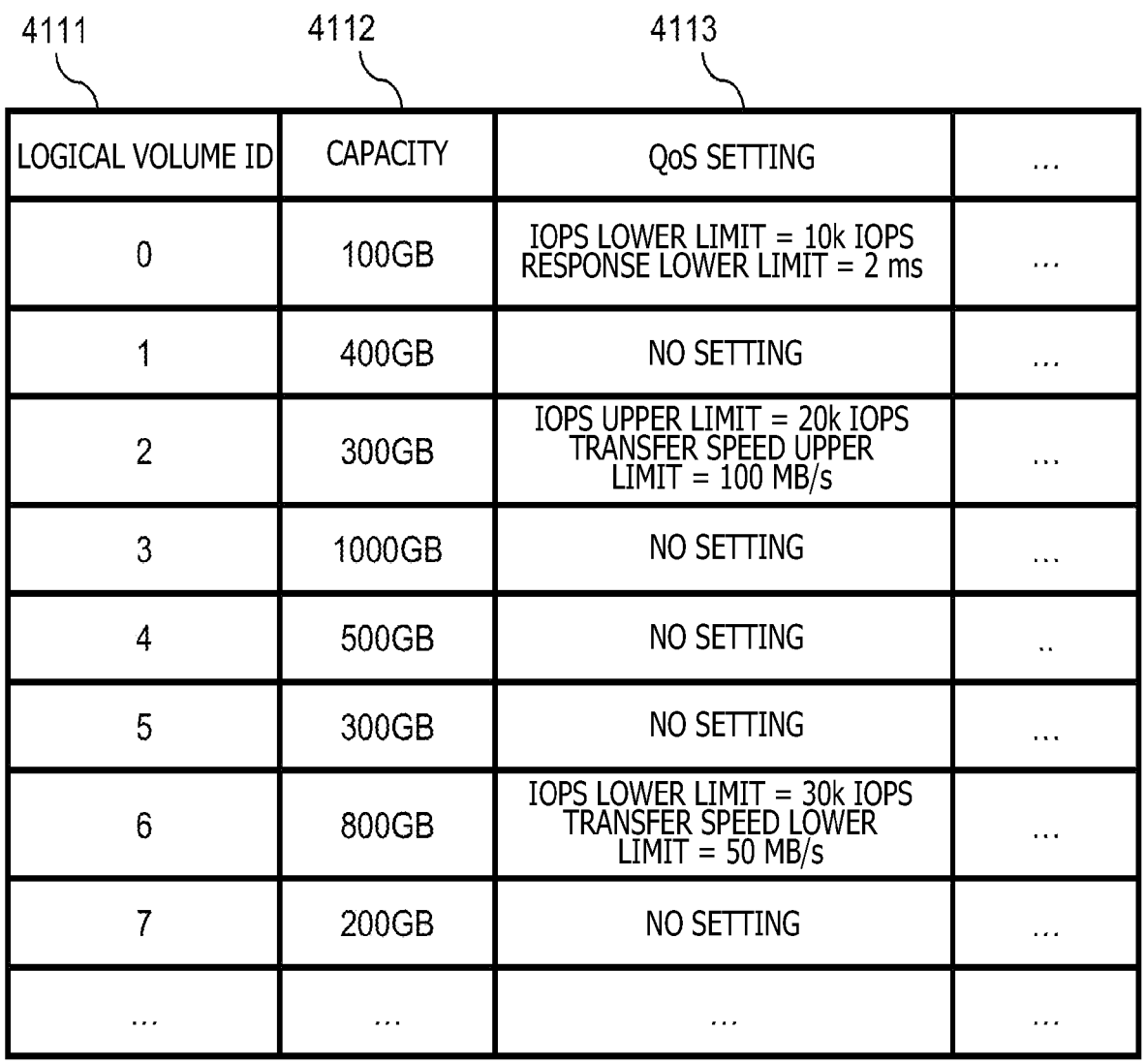
FIG. 4 is a diagram depicting a configuration example of a logical volume management table according to the first embodiment.

FIG. 4 is a diagram depicting an example of the logical volume management table 4110.

The logical volume management table 4110 manages definitions of each of the logical volumes 2210, such as logical volume ID, a capacity, and a quality of service (QoS) setting. The logical volume management table 4110 is stored in the memory 2202 of the IO module 2200. Each of entries of the logical volume management table 4110 includes logical volume ID 4111, a capacity 4112, and a QoS setting 4113.

The logical volume ID 4111 is ID for uniquely identifying the logical volume 2210. The logical volume ID 4111 constituted by numerals of serial numbers in FIG. 4 is not required to be constituted by serial numbers, and may be ID using characters other than numerals. The capacity 4112 is information indicating a capacity allocated to the corresponding logical volume 2210. The QoS setting 4113 is information indicating a setting of QoS of the corresponding logical volume 2210. For example, the QoS setting 4113 is expressed by a combination of an upper limit and/or a lower limit of performance metrics such as an IOPS, a transfer speed, and a response. The QoS setting 4113 is expressed as "no setting" in a case where no QoS is set.

The first row of the logical volume management table 4110 depicted in FIG. 4 indicates that the logical volume 2210 having the logical volume ID 4111 of "0" has the capacity 4112 of "100 GB" and the QoS setting 4113 of "lower limit of IOPS: 10 k IOPS" and "lower limit of response: 2 ms."

FIG. 5 is a diagram depicting an example of the host management table 4120.

The host management table 4120 is a table for management of information associated with connection and communication between the storage apparatus 2000 and the host 3000. The host management table 4120 manages information associated with ID, a connection protocol, and a WWN of the FE port 2206 to which the host 3000 is connected. The host management table 4120 is stored in the memory 2202 of the IO module 2200. Each of entries of the host management table 4120 includes host ID 4121, FE port ID 4122, a protocol 4123, a WWN 4124, and an iSCSI qualified name (IQN) 4125.

The host ID 4121 is ID for uniquely identifying the host 3000. The host ID 4121 constituted by numerals of serial numbers in FIG. 5 is not required to be constituted by serial numbers, and may be ID using characters other than numerals. The FE port ID 4122 is ID of the FE port 2206 to which the host 3000 is connected. The protocol 4123 is a communication protocol used for connection between the host 3000 and the storage apparatus 2000. The WWN 4124 is identification information given to Host Bus Adapter (HBA) of the host 3000 and peculiar to the HBA, and is information referred to when the FC is used as a protocol. The IQN 4125 is identification information given to iSCSI Initiator of the host 3000 and peculiar to the iSCSI Initiator, and is information referred to when iSCSI is used as a protocol.

The first row of the host management table 4120 depicted in FIG. 5 indicates that the host 3000 having the host ID 4121 of "0" is connected to the FE port 2206 having the FE port ID 4122 of "0" by "FC" and that the WWN 4124 of the HBA of the host 3000 is "abcd012345fedcba."

FIG. 6 is a diagram depicting an example of the IO path management table 4130.

The path management table 4130 is a table for management of a correspondence between a certain host 3000 and the logical volume 2210 allocated to the host 3000. The path management table 4130 is stored in the memory 2202 of the IO module 2200. Each of entries of the path management table 4130 includes the host ID 4121, the logical volume ID 4111, and a logical unit number (LUN) 4131. The LUN 4131 is identification information referred to by the host 3000 for identifying each of the logical volumes 2210 when a plurality of the logical volumes 2210 are allocated to one host 3000.

The second row and the third row of the path management table depicted in FIG. 6 indicate that the host 3000 having the host ID 4121 of "1" is configured such that the logical volumes 2210 having the logical volume ID 4111 of "0" and "2" are allocated with the respective LUNs 4131 of "0" and "1."

Figure 7:
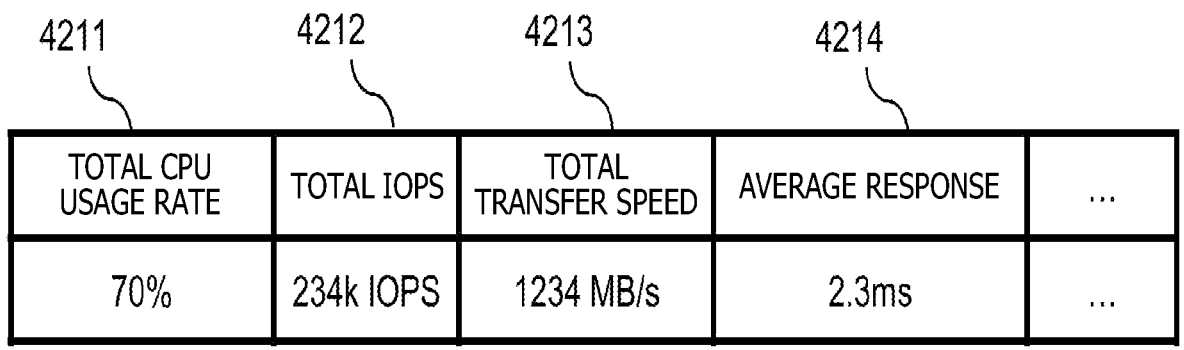
FIG. 7 is a diagram depicting a configuration example of a system operational data table according to the first embodiment.

FIG. 7 is a diagram depicting an example of the system operational data table 4210.

The system operational data table 4210 is a table which stores the operational data 4200 associated with the entire IO module 2200. The system operational data table 4210 is stored in the memory 2202 of the IO module 2200. The system operational data table 4210 includes a total CPU usage rate 4211, a total IOPS 4212, a total transfer speed 4213, and an average response 4214.

The total CPU usage rate 4211 is a total rate of a CPU time used for processing IO issued from the host 3000 to each of the logical volumes 2210 provided by the IO module 2200 for the host 3000. The total IOPS 4212 is a total IO number issued per unit time from the host 3000 to each of the logical volumes 2210 provided by the IO module 2200 for the host 3000. The total transfer speed 4213 is a total transfer speed of IO issued per unit time from the host 3000 to each of the logical volumes 2210 provided by the IO module 2200 for the host 3000. The average response 4214 is an average response time with respect to IO issued per unit time from the host 3000 to each of the logical volumes 2210 provided by the IO module 2200 for the host 3000.

The first row of the system operational data table 4210 depicted in FIG. 7 indicates the total CPU usage rate 4211 as "70%," the total IOPS 4212 as "234 k IOPS," the total transfer speed 4213 as "1234 MB/s," and the average response 4214 as "2.3 ms."

FIG. 8 is a diagram depicting an example of the logical volume operational data table 4220.

The logical volume operational data table 4220 is a table which stores the operational data 4200 associated with each of the logical volumes 2210. The logical volume operational data table 4220 is stored in the memory 2202 of the IO module 2200. The logical volume operational data table 4220 includes the logical volume ID 4111, a CPU usage rate 4221, a connected host number 4222, a usage capacity 4223, an IOPS 4224, a response 4225, and a transfer speed 4226.

The CPU usage rate 4221 is a rate of a CPU time used for processing IO issued from the host 3000 to the logical volume 2210 having the logical volume ID 4111. The connected host number 4222 is the number of hosts 3000 to each of which the logical volume 2210 having the logical volume ID 4111 is allocated and the number of entries each including the logical volume 2210 having the logical volume ID 4111 in the path management table 4130. The usage capacity 4223 is a capacity used for actually storing data from the host 3000 in the capacity allocated to the logical volume 2210 having the logical volume ID 4111. The IOPS 4224 is the number of IO issued per unit time from the host 3000 to the logical volume 2210 having the logical volume ID 4111. The response 4225 is an average response time with respect to IO issued per unit time from the host 3000 to the logical volume 2210 having the logical volume ID 4111. The transfer speed 4226 is a transfer speed of IO issued per unit time from the host 3000 to the logical volume 2210 having the logical volume ID 4111.

The first row of the logical volume operational data table 4220 depicted in FIG. 8 indicates that the logical volume 2210 having the logical volume ID 4111 of "0" has the CPU usage rate 4221 of "3%," the connected host number 4222 of "1," the usage capacity 4223 of "90 GB," the IOPS 4224 of "15 k IOPS," the response 4225 of "1.4 ms," and the transfer speed 4226 of "63 MB/s."

FIG. 9 is a diagram depicting an example of the logical volume operational data cache table 5110.

The logical volume operational data cache table 5110 is a table created by caching the logical volume operational data table 4220 stored in the memory 2202 of the IO module 2200 by use of the management module 2100. The logical volume operational data cache table 5110 is stored in the memory 2102 of the management module 2100. The logical volume operational data cache table 5110 includes the logical volume ID 4111, the CPU usage rate 4221, the connected host number 4222, the usage capacity 4223, the IOPS 4224, the response 4225 (not depicted in FIG. 9), the transfer speed 4226 (not depicted in FIG. 9), and a time stamp 5111. The time stamp 5111 is an entry update time of a cache of the operational data 4200 that is associated with the logical volume 2210 having the logical volume ID 4111 and that has been acquired from the IO module 2200.

The first row of the logical volume operational data cache table 5110 depicted in FIG. 9 indicates that the logical volume 2210 having the logical volume ID 4111 of "0" has the CPU usage rate 4221 of "3%," the connected host number 4222 of "1," the usage capacity 4223 of "90 GB," the IOPS 4224 of "15 k IOPS," the response 4225 of "1.4 ms" (not presented in FIG. 9), and the transfer speed 4226 of "63 MB/s" (not presented in FIG. 9), and shows that these items of information have been acquired from the IO module 2200 at "18: 23: 53" indicated by the time stamp 5111.

Described above is the management information associated with the storage apparatus 2000 according to the present embodiment. Note that the management information described above is management information used for control in the present embodiment and often contained in the storage apparatus 2000 of a typical type. Additional columns may be given to the respective pieces of the management information to add information as necessary. Alternatively, in a case where unnecessary information is present in the respective pieces of the management information, columns corresponding to the unnecessary information may be eliminated. For example, if a thin provisioning function, a data compression function, or a duplication removal function are provided, columns indicating validity or invalidity of the corresponding functions may be added to the logical volume management table 4110. Moreover, a column indicating a data reduction amount achieved by each of the functions may be added to the logical volume operational data table 4220. Furthermore, in a case where the storage apparatus 2000 not handling the FC is present in the host management table 4120, the column of WWN may be eliminated, or a column for handling NVMeoF may be added. In addition, while distinction between reading and writing of IO for the IOPS, the transfer speed, and the response is not made in the system operational data table 4210 and the logical volume operational data table 4220 in the above description, distinction between reading and writing of IO may be made for these items. Besides, a table for managing various types of settings used in the following description and other settings may be prepared for the memory 2102 of the management module 2100 and/or the memory 2202 of the IO module 2200 such that the administrator of the storage system can refer to or update the prepared table via the management module 2100.

A conventional problem and a solution according to the present embodiment will next be described. Note that, description focused on the operational data 4200 associated with the logical volume 2210 will be presented below, but the description is applicable to the operational data 4200 of other types. In that case, it is assumed that a process for determining whether or not highly accurate update is necessary for each entry of the operational data 4200 is appropriately performed according to each type of the operational data 4200 and that information necessary for the determination process is stored in the memory 2202 of the IO module 2200 or the memory 2102 of the management module 2100.

Figure 10:
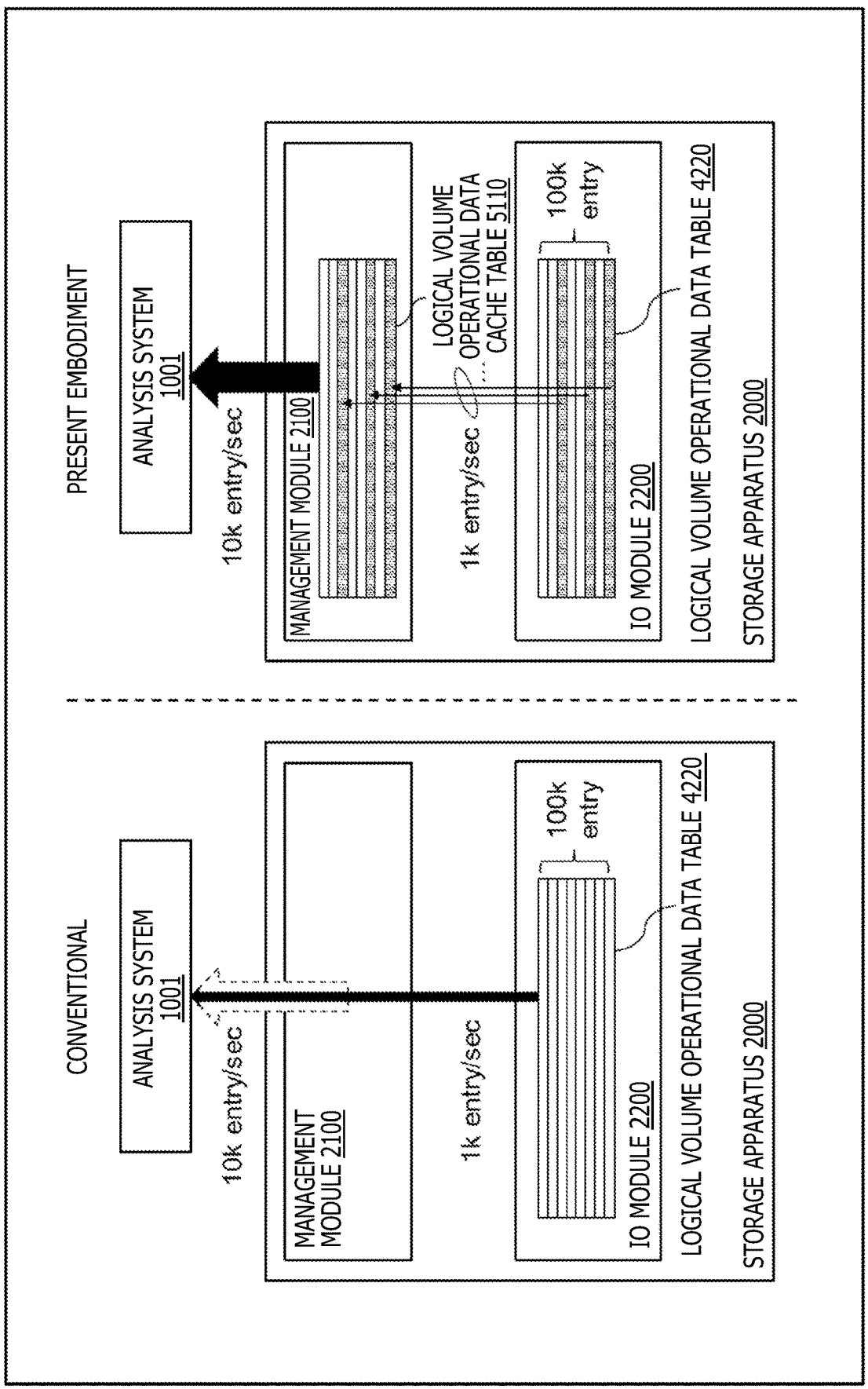
FIG. 10 is a conceptual diagram explaining a conventional problem and a solution according to the first embodiment.

FIG. 10 is a conceptual diagram explaining the conventional problem and the solution according to the present embodiment. The left part and the right part of FIG. 10 each depict a state where the storage apparatus 2000 transfers the operational data 4200 from the IO module 2200 to the analysis system 1001 via the management module 2100 to meet a request for acquisition of the operational data 4200 associated with all the logical volumes 2210 as a request received from the analysis system 1001.

The conventional problem will first be described with reference to the left part of FIG. 10. In the example of FIG. 10, 100$k$ entries (logical volumes 2210) are present in the logical volume operational data table 4220. In addition, at most 1 k entry of the operational data 4200 can be transferred per second (1 k entry/sec) from the IO module 2200 to the management module 2100, and at most 10 k entries of the operational data 4200 can be transferred per second (10 k entry/sec) from the management module 2100 to the analysis system 1001.

As depicted in FIG. 10, an entry transfer throughput between the IO module 2200 and the management module 2100 (the number of entries of the operational data 4200 transferrable per second) is relatively low. This throughput is relatively low because the IO module 2200 generally gives first priority to processing of an IO request from the host 3000. In this case, only low priority is given to processing not related to IO such as transfer of an entry of the operational data 4200 so as to eliminate any influence on the performance for the IO request. As a result, the entry transfer throughput between the analysis system 1001 and the management module 2100 is rate-limited to the entry transfer throughput between the IO module 2200 and the management module 2100 even when the entry transfer throughput between the analysis system 1001 and the management module 2100 is high. According to the example in the left part of FIG. 10, a theoretical entry transfer throughput between the management module 2100 and the analysis system 1001 is 10 k entry/sec. However, an actual entry transfer throughput between the management module 2100 and the analysis system 1001 is rate-limited to 1 k entry/sec. In this case, a time of 100 seconds is required to transfer 100$k$ entries between the management module 2100 and the analysis system 1001.

An outline of the solution according to the present embodiment will next be described with reference to the right part of FIG. 10.

Analysis of the operational data 4200 performed by the analysis system 1001 covers a wide range including performance anomaly detection, health check, failure prediction, performance trend analysis, capacity trend analysis, and others. However, it is not required to carry out analysis for all of the logical volumes 2210 at an approximately uniform level of accuracy and frequency. For example, in a case of the logical volume 2210 where substantially no or absolutely no IO occurs, it is considered that substantially no change of the capacity trend is produced, without any sophisticated analysis. Moreover, in the case of the logical volume 2210 where substantially no or absolutely no IO occurs, accuracy of performance anomaly detection is likely to decrease due to an excessively small volume of significant operational data 4200 even when sophisticated analysis is carried out. In this case, an analysis result of the analysis system 1001 is not considerably affected even when the accuracy of the operational data 4200 associated with the foregoing logical volume 2210 is low.

According to the present embodiment, necessity of transferring high-accuracy operational data 4200 to analysis system 1001 is determined for each entry of logical volume operational data table 4220, and if an entry is determined as high-accuracy data is not necessary, low-accuracy operational data 4200 is transferred to the analysis system for that entry. According to the present embodiment, this solution is achieved by controlling the update timing of each entry of the logical volume operational data cache table 5110.

The management module 2100 in the present embodiment transfers information included in the logical volume operational data cache table 5110 included in the management module 2100 to the analysis system 1001, when receiving an acquisition request for acquiring the operational data 4200 associated with the logical volume 2210 from the analysis system 1001. Accordingly, the entry transfer throughput between the management module 2100 and the analysis system 1001 is not rate-limited to the entry transfer throughput between the IO module 2200 and the management module 2100.

In addition, according to the present embodiment, the management module 2100 acquires entries of the logical volume operational data table 4220 from the IO module 2200, and updates the logical volume operational data cache table 5110. Note that, the entry transfer throughput between the IO module 2200 and the management module 2100 does not improve. For example, for simply updating the entire logical volume operational data cache table 5110 having 100 k entries under an entry transfer throughput of 1 k entry/sec for cache update, a time of 100 seconds is required. Accordingly, in the present embodiment, entries of the cache are updated not in a uniform manner but in a manner of changing the cache update frequency for each entry. Specifically, the management module 2100 determines whether or not high-accuracy operational data 4200 is necessary for each of the logical volumes 2210. The management module 2100 updates the operational data cache 5100 at a lowest possible frequency for the logical volume 2210 determined as requiring only low-accuracy operational data 4200. In this manner, consumption of the entry transfer throughput between the IO module 2200 and the management module 2100 decreases. On the other hand, the management module 2100 updates the operational data cache 5100 at a high frequency for the logical volume 2210 determined as requiring high-accuracy operational data 4200, to transfer the latest possible operational data 4200 to the analysis system 1001. In this manner, sufficient accuracy of analysis performed by the analysis system 1001 is secured.

The present embodiment will be described in more detail below with reference to FIGS. 11 to 17.

Note that described in the present embodiment is such a configuration where the management module 2100 in the storage apparatus 2000 caches the operational data 4200 and controls timing of the cache update. However, the present embodiment is not required to adopt this configuration. For example, in a configuration where the analysis system 1001 directly communicates with the IO module 2200 without the presence of the management module 2100, the analysis system 1001 may cache the operational data 4200 and control the cache update timing.

Figure 11:
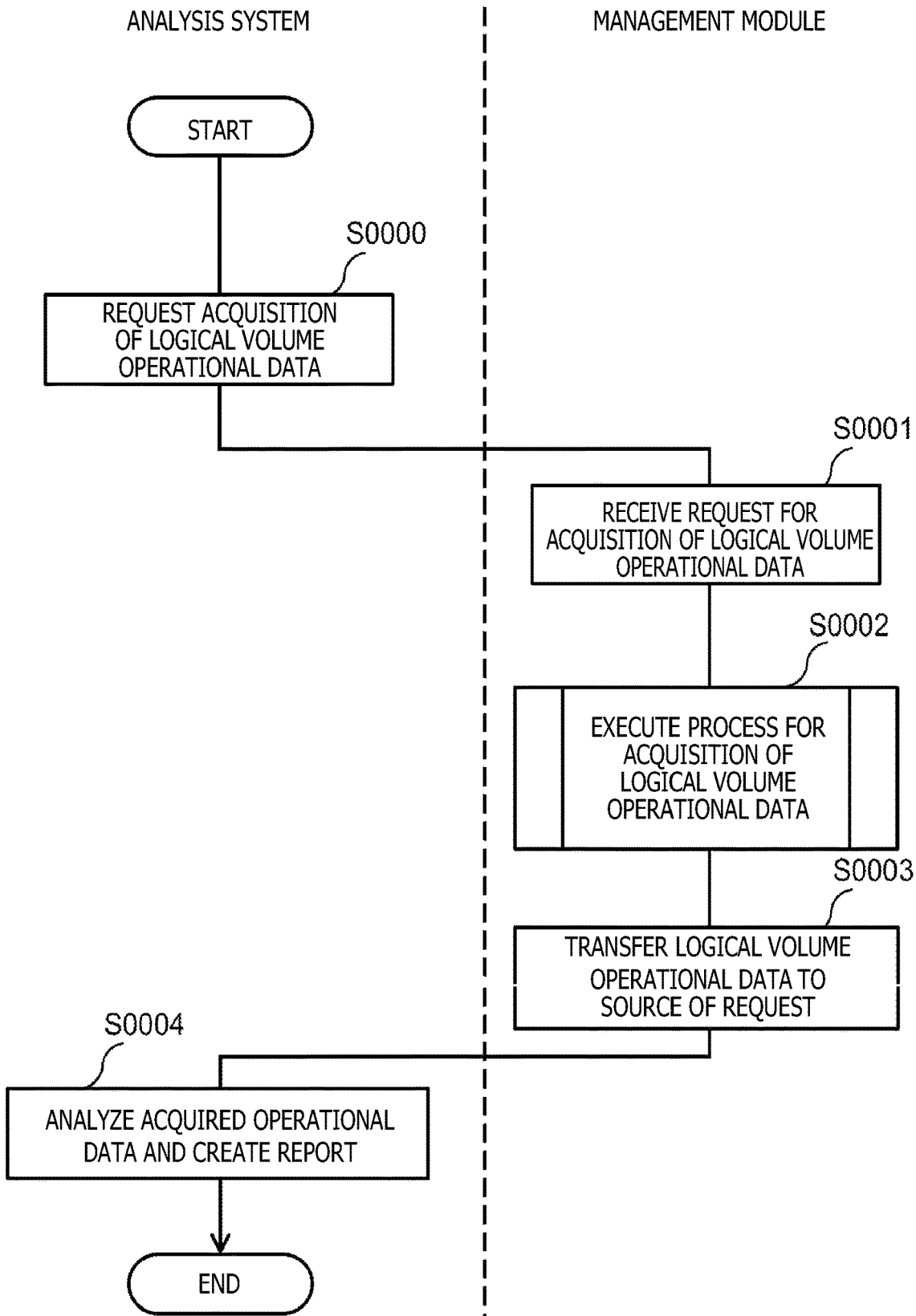
FIG. 11 is a flowchart presenting a processing example of operational data analysis performed by an analysis system according to the first embodiment.

FIG. 11 is a flowchart presenting an example of a process where the analysis system 1001 monitors and analyzes the operational data 4200 associated with the storage apparatus 2000. This process is started for each fixed time interval in the cloud 1000 where the analysis system 1001 operates, in a computing environment prepared by a customer, or the like. Processing included in this process and executed by the analysis system 1001 operates in the cloud 1000 where the analysis system 1001 operates or in the computing environment. A program of the process is stored in a memory of this environment. Moreover, processing included in this process and executed by the management module 2100 may be contained in the management module control program 5000 in the memory 2102 of the management module 2100.

The analysis system 1001 issues an acquisition request for acquiring the operational data 4200 associated with the logical volume 2210 to the management module 2100 of the storage apparatus 2000 as an analysis target (S0000). At this time, the analysis system 1001 designates a timeout as a maximum time usable by the management module 2100 for processing the acquisition request. This timeout may be calculated from an execution cycle of various analysis processes performed by the analysis system 1001 itself, for example. Note that the high-accuracy operational data 4200 may be necessary for all of the logical volumes 2210 due to a low execution frequency depending on contents of analysis. In this case, the analysis system 1001 may designate an unlimited timeout.

In a case of reception of the acquisition request for acquiring the operational data 4200 associated with the logical volume 2210 (S0001), the management module 2100 of the storage apparatus 2000 executes the following process. Specifically, the management module 2100 executes an internal process for updating the logical volume operational data cache table 5110 in response to the received acquisition request (S0002).

Figure 12:
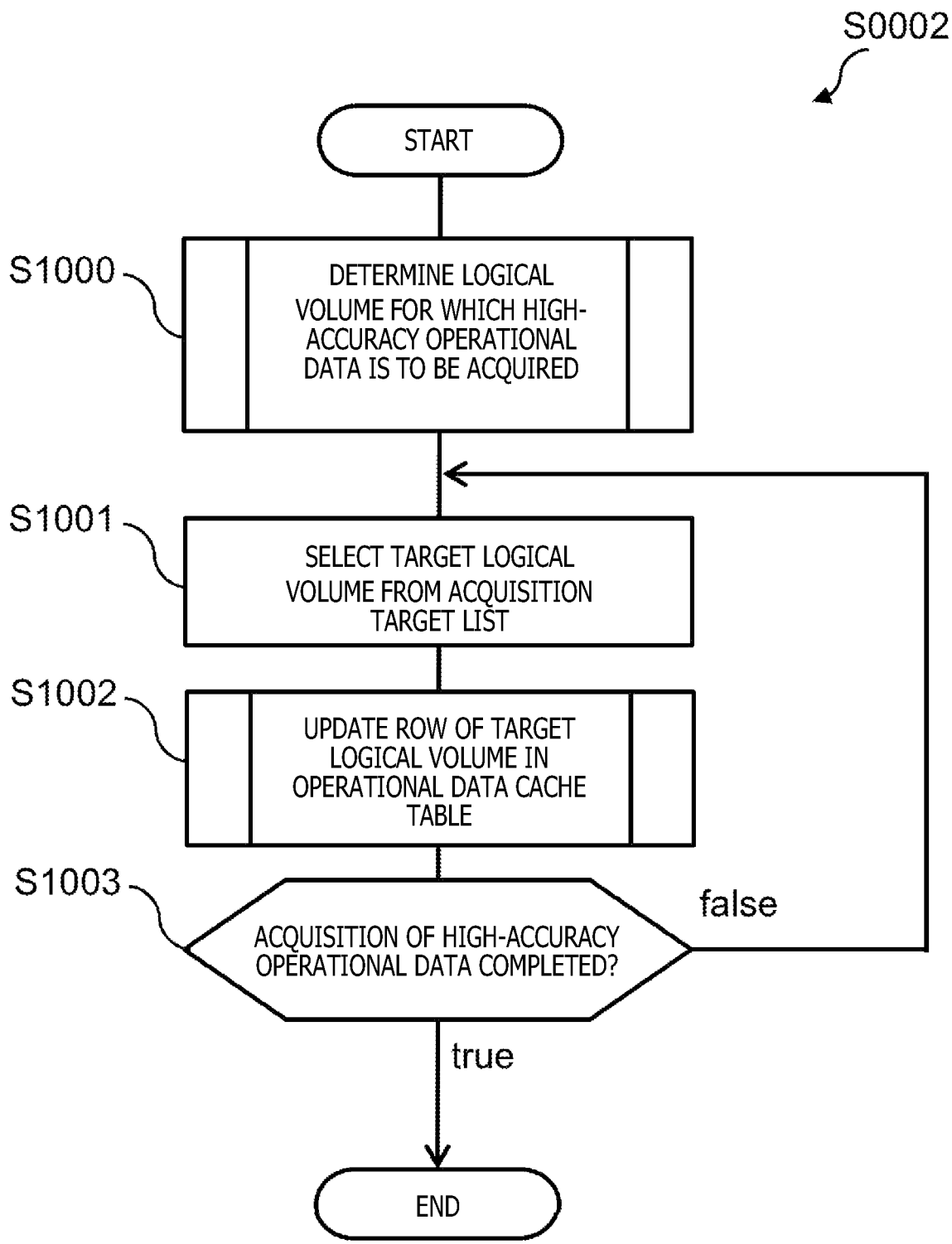
FIG. 12 is a flowchart presenting an example of internal processing for acquiring operational data according to the first embodiment.

The management module 2100 transfers the logical volume operational data cache table 5110 to the analysis system 1001 as the source of the request, after completion of the internal process (S0003). According to the present embodiment, step S1000 in FIG. 12 is executed as this internal process.

The analysis system 1001 acquires the requested logical volume operational data, carries out analysis using the acquired operational data 4200, and creates an analysis result report (S0004). For example, the analysis carried out here is performance anomaly detection, health check, failure prediction, performance trend analysis, capacity trend analysis, or the like. The administrator of the storage system may regularly check the created analysis result report to use the report for operation management of the storage system.

The analysis system 1001 may perform the following process in a case of detection of any abnormality or problem and determination that an intervention by the administrator of the storage system is necessary based on the result of the detection. Specifically, the analysis system 1001 may transmit a notice indicating occurrence of a problem to the administrator of the storage system by using an e-mail, a short message service (SMS), a messenger application, or the like.

In FIG. 11, a communication process starts from a starting point corresponding to the analysis system 1001. However, communication from the analysis system 1001 to the management module 2100 is limited in some cases from a viewpoint of security or the like. When this communication is limited, the management module 2100 may regularly inquire of the analysis system 1001 whether or not the operational data 4200 of the logical volume 2210 needs to be transferred.

Note that FIG. 11 depicts a case of analysis of the operational data 4200 associated with the logical volume 2210. This case is depicted because the operational data 4200 associated with the logical volume 2210 is generally one of cases requiring a large transfer amount due to a large number of entries. In an actual situation, the analysis system 1001 may acquire any type of the operational data 4200, such as the operational data 4200 associated with the entire system, the operational data 4200 associated with the host 3000, the operational data 4200 associated with the drive 2209, and the operational data 4200 associated with the respective ports, from the storage apparatus 2000, and analyze the acquired operational data 4200, as necessary. At this time, the analysis system 1001 may adopt the contents of the present embodiment as necessary, or need not adopt the contents of the present embodiment if unnecessary.

Note that information indicating "no update" may be transferred for an entry where the operational data 4200 is not updated from previous transfer. In this manner, saving of the transfer throughput between the management module 2100 and the analysis system 1001 is achievable. For example, the analysis system 1001 may perform the following operation. Specifically, in step S0000, the analysis system 1001 designates a date and time of acquisition of the previous operational data 4200 in addition to a timeout, at the time of making an acquisition request for acquiring the operational data 4200. In step S0003, the management module 2100 transfers information including a time stamp set to a time after the designated previous acquisition date and time and included in the logical volume operational data cache table 5110.

FIG. 12 is a flowchart presenting an example of a process which prepares the logical volume operational data cache table 5110 for allowing transfer from the management module 2100 to the analysis system 1001. The management module 2100 may achieve this process by executing the management module control program 5000 in the memory 2102.

The management module 2100 determines the logical volume 2210 for which the latest (high-accuracy) operational data 4200 is to be acquired in the IO module 2200, and stores the determined logical volume 2210 in an acquisition target list (S1000). Details of this process will be described later (see FIG. 14).

The management module 2100 selects the logical volume 2210 as a processing target (hereinafter referred to as a "target logical volume") one by one from the acquisition target list (S1001), acquires the operational data 4200 associated with the target logical volume 2210 from the IO module 2200, and updates the logical volume operational data cache table 5110 (S1002). Details of this update process will be described later (see FIG. 17).

The management module 2100 ends the present process in a case of completion of acquisition of the operational data 4200 and update of the cache for all of the logical volumes 2210 in the acquisition target list (S1003: true), or returns to the processing in step S1001 in a case of incompletion (S1003: false).

Figure 13:
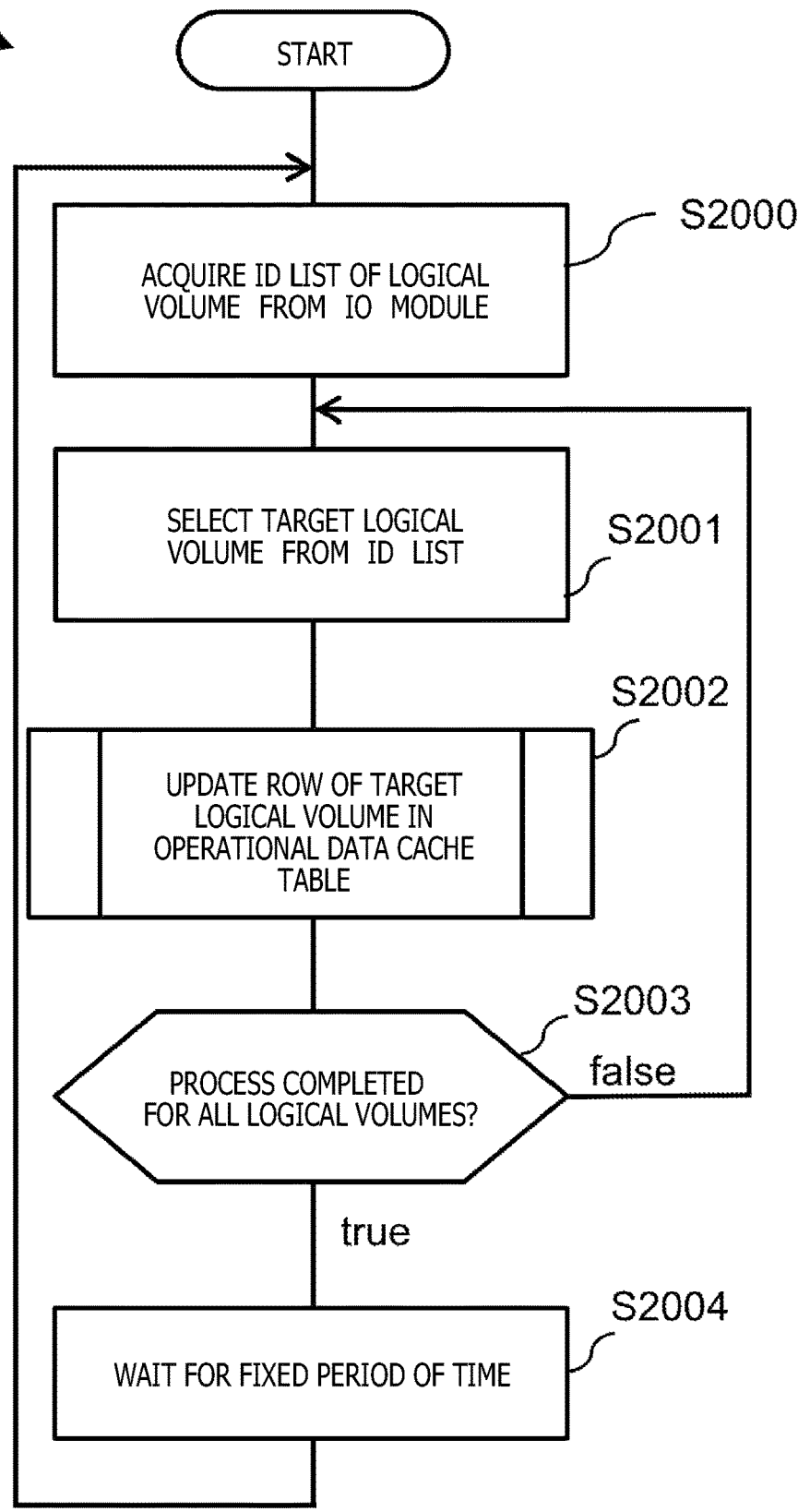
FIG. 13 is a flowchart presenting an example of a process for updating low-accuracy operational data according to the first embodiment.

FIG. 13 is a flowchart presenting an example of a process for updating the operational data 4200 associated with all of the logical volumes 2210 at a lowest possible frequency, including the logical volume 2210 determined as requiring only the low-accuracy operational data 4200. The management module 2100 may achieve this process by executing the management module control program 5000 in the memory 2102. Moreover, the management module 2100 may execute this process as a background process constantly or when appropriate.

The management module 2100 acquires an ID list of the logical volume 2210 from the IO module 2200 (S2000). While not presented in FIG. 13, the management module 2100 transmits an acquisition request for acquiring an ID list to the IO module 2200. The IO module 2200 having received this request extracts information associated with the logical volume ID from the logical volume management table 4110, and transfers the extracted information to the management module 2100.

The management module 2100 selects the logical volume 2210 as a processing target one by one from the acquired ID list (S2001), acquires the operational data 4200 associated with the target logical volume 2210 from the IO module 2200, and updates the logical volume operational data cache table 5110 (S2002). Details of this update process will be described later (see FIG. 17).

The management module 2100 proceeds to processing in step S2004 in a case of completion of acquisition of the operational data 4200 and update of the cache for all of the logical volumes 2210 in the ID list (S2003: true), or returns to the processing in step S2001 in a case of incompletion (S2003: false).

In step S2004, the management module 2100 waits for a fixed period of time (S2004), and then returns to the processing in step S2000. This wait period corresponds to an update frequency of the low-accuracy operational data 4200. A larger number of pieces of the high-accuracy operational data 4200 associated with a larger number of the logical volumes 2210 can be acquired from the IO module 2200 by setting a longer wait period within a range not affecting the analysis accuracy.

Note that the management module 2100 may temporarily stop the process presented in FIG. 13 during execution of the process handling the request from the analysis system 1001, to give priority to transfer of the high-accuracy operational data 4200. In this case, a table for storing a request from the analysis system 1001 that is currently being processed may be added to the memory 2102 of the management module 2100. In addition, a process for temporarily stopping the process presented in FIG. 13 in a case where an entry is present in this table may be added at a timing before or after the respective steps, for example.

Note that a setting of the wait period in step S2004 may be hard-coded in the program. Alternatively, a table for managing this setting may be prepared in the memory 2102 of the management module 2100, and the administrator or the like of the storage system may rewrite the table as necessary.

Figure 14:
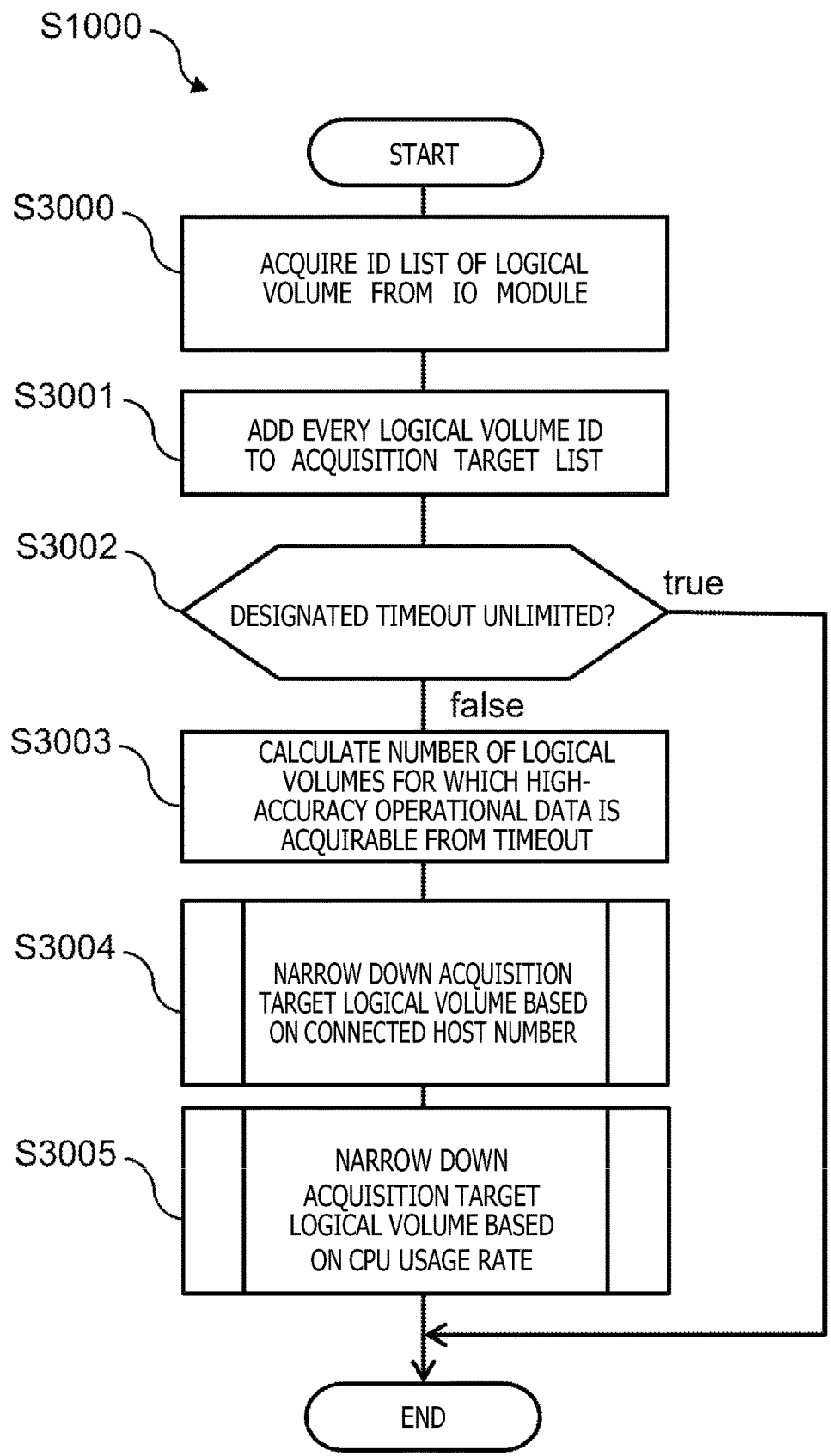
FIG. 14 is a flowchart presenting an example of a process for determining a target for which high-accuracy operational data is acquired according to the first embodiment.

FIG. 14 is a flowchart presenting an example of a process which determines the logical volume 2210 for which the high-accuracy operational data 4200 is to be acquired in the IO module 2200. The management module 2100 may achieve this process by executing the management module control program 5000 in the memory 2102.

The management module 2100 acquires an ID list of the logical volumes 2210 from the IO module 2200 (S3000). While not depicted in FIG. 14, the management module 2100 transmits an acquisition request for acquiring an ID list to the IO module 2200. The IO module 2200 having received this request extracts information associated with the logical volume ID from the logical volume management table 4110, and transfers the extracted information to the management module 2100.

The management module 2100 temporarily adds every ID of all of the acquired logical volumes 2210 to the acquisition target list (S3001).

The management module 2100 determines whether or not a timeout designated by the analysis system 1001 is unlimited (S3002). In a case where the timeout is unlimited (S3002: true), the management module 2100 ends the present process, and returns the acquisition target list to the process corresponding to the source of the call.

In a case where the timeout is not unlimited (S3002: false), the management module 2100 proceeds to processing in step S3003.

In step S3003, the management module 2100 calculates the number of the logical volumes 2210 for which the high-accuracy operational data 4200 is acquirable, on the basis of the timeout designated by the analysis system 1001, the entry transfer throughput between the IO module 2200 and the management module 2100, a time required for completion until this processing, and the like. For example, the management module 2100 calculates that the high-accuracy operational data 4200 is acquirable for each of the 7 k logical volumes 2210 on the basis of a remaining time of 7 seconds until the timeout on an assumption of 10 seconds for the timeout, 1 k entry/sec for the entry transfer throughput, and 3 seconds for the time required until this processing.

Subsequently, the management module 2100 narrows down the acquisition target list to reduce the number of the logical volumes 2210 to a number falling within a range of the calculated number of the logical volumes 2210 for which the high-accuracy operational data 4200 is acquirable. For example, the management module 2100 first narrows down the acquisition target list on the basis of the number of connected hosts (S3004), and then narrows down the acquisition target list on the basis of a CPU usage rate (S3005). Note that details of the processing in S3004 will be described with reference to FIG. 15 and that details of the processing in S3005 will be described with reference to FIG. 16.

Figure 15:
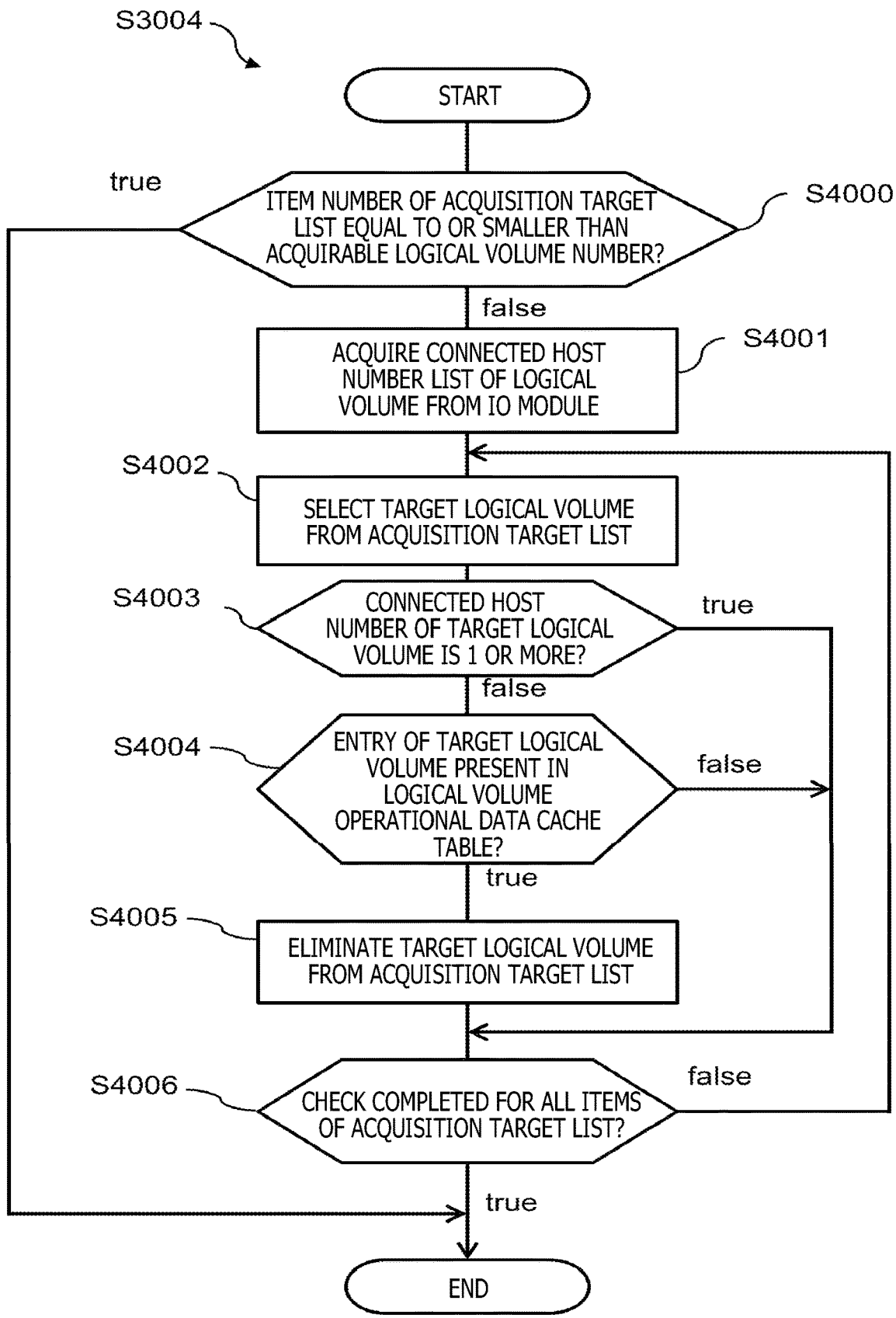
FIG. 15 is a flowchart presenting an example of a process for narrowing down a target for which high-accuracy operational data is to be acquired, on the basis of the number of connected hosts according to the first embodiment.
Figure 16:
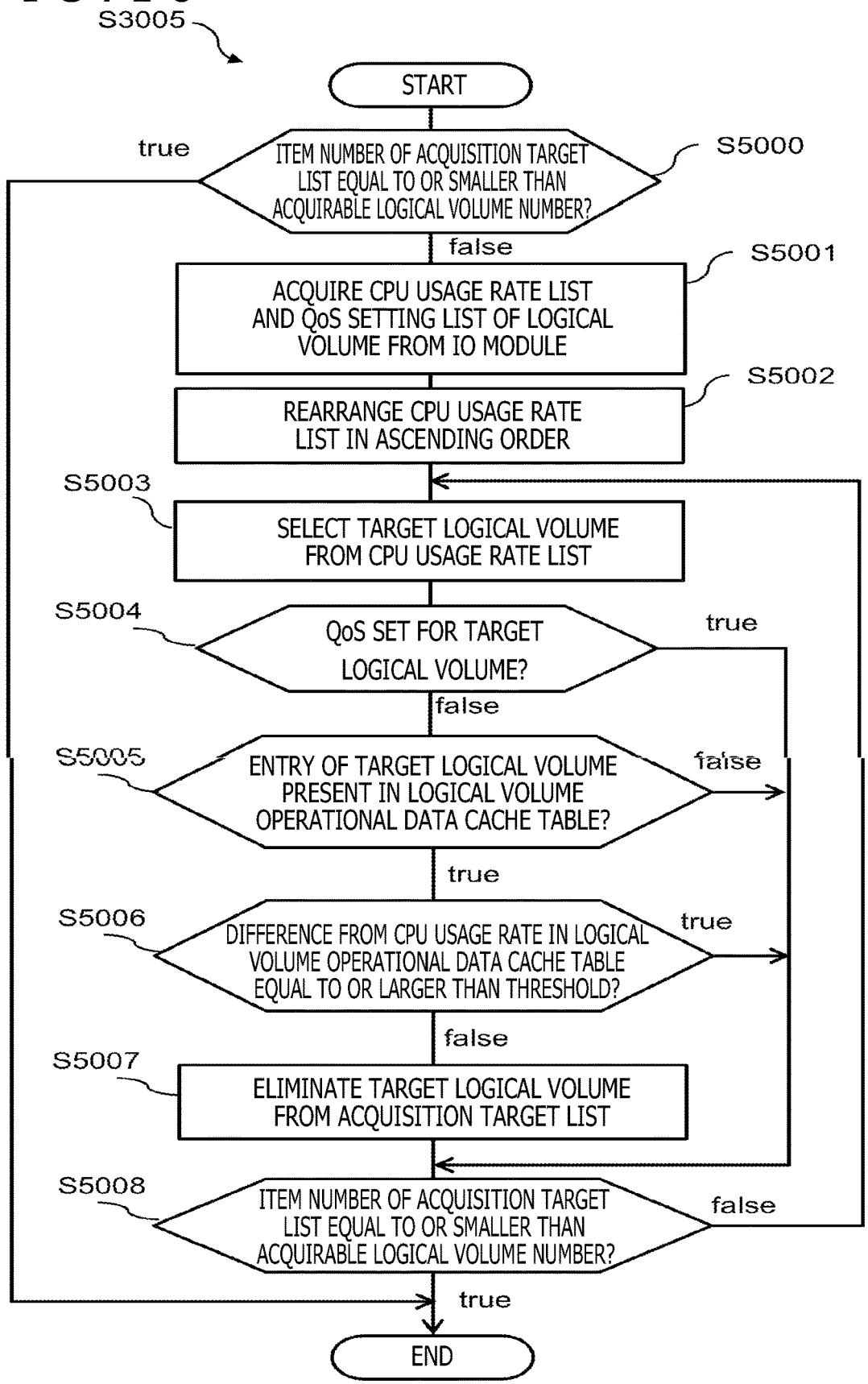
FIG. 16 is a flowchart presenting an example of a process for narrowing down a target for which high-accuracy operational data is to be acquired, on the basis of a CPU usage rate according to the first embodiment.

Note that narrowing-down processes in FIGS. 15 and 16 each acquire information necessary for the narrowing-down from the respective IO modules 2200. However, it is generally not efficient to acquire information individually from each of the IO modules 2200. Accordingly, the management module 2100 may collectively acquire information necessary for the narrowing-down from the IO modules 2200, after the processing in step S3003.

Moreover, any narrowing-down process other than these processes or a process for excluding the particular logical volume 2210 from the narrowing-down may be added as long as the number of the logical volumes 2210 in the acquisition target list finally falls within the range of the acquirable number. For example, the analysis system 1001 may designate the logical volume 2210 determined as requiring analysis with reference to the high-accuracy operational data 4200 based on previous analysis, at the time of the acquisition request for acquiring the operational data 4200. Then, the management module 2100 may exclude the designated logical volume 2210 from the narrowing-down target.

Moreover, a date and time at which the logical volume 2210 is created or a date and time at which a setting change is made for the logical volume 2210 may be added as a column of the logical volume management table 4110. In this case, the management module 2100 may preferentially acquire the high-accuracy operational data 4200 for the logical volume 2210 a tendency of which is unclear, before an elapse of days after addition or a setting change.

Furthermore, the management module 2100 may narrow down the logical volumes 2210 for which the high-accuracy operational data 4200 is to be acquired, by using evaluation values produced by normalizing and weighting respective evaluation items such as the number of connected hosts, a CPU usage rate, presence or absence of a QoS setting, elapsed days from creation, and elapsed days from a setting change, rather than determining whether or not to acquire the high-accuracy operational data 4200 by performing individual and independent determination processes.

In a case of completion of the foregoing narrowing-down, the management module 2100 ends the present process and returns the acquisition target list to the process corresponding to the source of the call.

FIG. 15 is a flowchart presenting an example of a process for narrowing down the high-accuracy operational data 4200 to be acquired, on the basis of the number of connected hosts. The management module 2100 may achieve this process by executing the management module control program 5000 in the memory 2102.

The management module 2100 determines whether or not the number of the logical volumes 2210 included in the acquisition target list is equal to or smaller than the number of the logical volumes 2210 for which the high-accuracy operational data 4200 is acquirable (S4000). In a case where the number of the logical volumes 2210 included in the acquisition target list is equal to or smaller than the number of the logical volumes 2210 for which the high-accuracy operational data 4200 is acquirable (S4000: true), the management module 2100 ends the present process. The present process is ended because narrowing-down is unnecessary. In a case where the number of the logical volumes 2210 included in the acquisition target list is larger than the number of the logical volumes 2210 for which the high-accuracy operational data 4200 is acquirable (S4000: false), the management module 2100 proceeds to processing in step S4001.

The management module 2100 acquires a list of the number of hosts connected to the logical volume 2210 included in the acquisition target list from the IO module 2200 (S4001). While not depicted in FIG. 15, for example, the management module 2100 transmits an acquisition request for acquiring the number of connected hosts to the IO module 2200. The IO module 2200 having received this request extracts information associated with the number of connected hosts from the logical volume operational data table 4220, and transfers the extracted information to the management module 2100.

The management module 2100 selects the logical volume 2210 as a processing target (hereinafter referred to as a "target logical volume") one by one from the acquisition target list (S4002).

The management module 2100 determines whether or not the number of hosts connected to the target logical volume 2210 is one or more with reference to the host number list acquired in step S4001 (S4003).

The management module 2100 proceeds to processing in step S4006 in a case where the number of hosts connected to the target logical volume 2210 is one or more (S4003: true), or proceeds to processing in step S4004 in a case where the number of hosts connected to the target logical volume 2210 is 0 (S4003: false).

In step S4004, the management module 2100 searches the logical volume operational data cache table 5110 by using ID of the target logical volume 2210, to determine whether or not an entry of the target logical volume 2210 is present in the logical volume operational data cache table 5110 (S4004).

The management module 2100 proceeds to processing in step S4006 in a case where no entry of the target logical volume 2210 is present in the logical volume operational data cache table 5110 (S4004: false). The management module 2100 proceeds to processing in step S4005 in a case where an entry of the target logical volume 2210 is present in the logical volume operational data cache table 5110 (S4004: true). The presence or absence of any entry is determined herein because even the low-accuracy operational data 4200 becomes difficult to be transferred in a case of no entry in the logical volume operational data cache table 5110.

In step S4005, the management module 2100 eliminates the target logical volume 2210 from the acquisition target list (S4005). It is thus determined that the high-accuracy operational data 4200 need not be acquired for the target logical volume 2210.

The management module 2100 determines whether or not the processing in steps S4002 to S4005 is completed for all of the logical volumes 2210 in the acquisition target list (S4006). The management module 2100 ends the present process in a case of completion of the processing in steps S4002 to S4005 for all of the logical volumes 2210 in the acquisition target list (S4006: true), or returns to the processing in step S4002 in a case of incompletion (S4006: false).

FIG. 16 is a flowchart presenting an example of a process for narrowing down the target for which the high-accuracy operational data 4200 is to be acquired, on the basis of a CPU usage rate. The management module 2100 may achieve this process by executing the management module control program 5000 in the memory 2102.

The management module 2100 determines whether or not the number of the logical volumes 2210 included in the acquisition target list is equal to or smaller than the number of the logical volumes 2210 for which the high-accuracy operational data 4200 is acquirable (S5000). In a case where the number of the logical volumes 2210 included in the acquisition target list is equal to or smaller than the number of the logical volumes 2210 for which the high-accuracy operational data 4200 is acquirable (S5000: true), the management module 2100 ends the present process. The present process is ended because narrowing-down is unnecessary. In a case where the number of the logical volumes 2210 included in the acquisition target list is larger than the number of the logical volumes 2210 for which the high-accuracy operational data 4200 is acquirable (S5000: false), the management module 2100 proceeds to processing in step S5001.

The management module 2100 acquires a CPU usage rate and the presence or absence of a QoS setting associated with each of the logical volumes 2210 included in the acquisition target list from the IO module 2200 (S5001). While not depicted in FIG. 16, the management module 2100 transmits an acquisition request for acquiring the CPU usage rate and the QoS setting to the IO module 2200. The IO module 2200 having received this request extracts information associated with the presence or absence of the QoS setting and the CPU usage rate from the logical volume management table 4110 and the logical volume operational data table 4220, respectively, and transfers the extracted information to the management module 2100.

The management module 2100 rearranges the acquired CPU usage rate list such that the CPU usage rates are arranged in an ascending order (S5002).

The management module 2100 selects the logical volume 2210 as a processing target (hereinafter referred to as a "target logical volume") one by one from the CPU usage rate list (S5003). Thereafter, the management module 2100 determines whether or not to exclude the target logical volume 2210 from the acquisition target list, on the basis of determination made in steps S5004 to S5006 for the target logical volume 2210.

In step S5004, the management module 2100 determines whether a QoS has been set for the target logical volume 2210 with reference to a QoS setting list acquired in step S5001 (S5004).

The management module 2100 proceeds to processing in step S5008 in a case where a QoS has been set for the target logical volume 2210 (S5004: true), or proceeds to processing in step S5005 in a case where a QoS has not been set (S5004: false). The logical volume 2210 for which a QoS has been set is generally considered to have severe performance requirements. This determination process is thus performed to transfer, constantly or when appropriate, the high-accuracy operational data 4200 associated with the logical volume 2210 having severe performance requirements.

In step S5005, the management module 2100 determines whether or not an entry of the target logical volume 2210 is present in the logical volume operational data cache table 5110 (S5005). For example, the management module 2100 makes this determination by searching the ID of the target logical volume 2210 from the logical volume operational data cache table 5110.

The management module 2100 proceeds to processing in step S5008 in a case where no entry of the target logical volume 2210 is present in the logical volume operational data cache table 5110 (S5005: false). The management module 2100 proceeds to processing in step S5006 in a case where an entry of the target logical volume 2210 is present in the logical volume operational data cache table 5110 (S5005: true). The presence or absence of any entry is determined here because even the low-accuracy operational data 4200 becomes difficult to be transferred in a case of no entry in the logical volume operational data cache table 5110.

In step S5006, the management module 2100 calculates a difference between a CPU usage rate of the target logical volume 2210 stored in the logical volume operational data cache table 5110 and the latest CPU usage rate acquired in step S5001, and determines whether or not the difference is equal to or larger than a threshold (S5006).

The management module 2100 proceeds to processing in step S5008 in a case where the difference is equal to or larger than the threshold (S5006: true), or proceeds to processing in step S5007 in a case where the difference is smaller than the threshold (S5006: false). In this manner, the management module 2100 transfers the high-accuracy operational data 4200 for the logical volume 2210 where a phenomenon which the administrator of the storage system should be notified of may be caused as a result of a considerable change in the CPU usage rate. Accordingly, overlooked anomaly detection by the analysis system 1001 or the like can be reduced.

In step S5007, the management module 2100 eliminates the target logical volume 2210 from the acquisition target list (S5007). The target logical volume 2210 is eliminated on the basis of a determination that the high-accuracy operational data 4200 is unnecessary.

In step S5008, the management module 2100 determines whether or not the number of the logical volumes 2210 included in the acquisition target list is equal to or smaller than the number of the logical volumes 2210 for which the high-accuracy operational data 4200 is acquirable (S5008). In a case where the number of the logical volumes 2210 included in the acquisition target list is equal to or smaller than the number of the logical volumes 2210 for which the high-accuracy operational data 4200 is acquirable (S5008: true), the management module 2100 ends the present process. In a case where the number of the logical volumes 2210 included in the acquisition target list is larger than the number of the logical volumes 2210 for which the high-accuracy operational data 4200 is acquirable (S5008: false), the management module 2100 returns to the processing in step S5003.

In step S5002, the logical volumes 2210 are rearranged in an ascending order of the CPU usage rate. Accordingly, determination is sequentially made in an order from the logical volume 2210 having the lowest CPU usage rate and the fewest number of TO, in the determination process in steps S5004 to S5006. Thereafter, at the time when the number of the logical volumes 2210 included in the acquisition target list becomes equal to or smaller than the number of the logical volumes 2210 for which the high-accuracy operational data 4200 is acquirable, the determination process in steps S5004 to S5006 ends. As a result, the logical volumes 2210 are sequentially eliminated from the acquisition target list in an ascending order of the number of IO and the CPU usage rate, and thus, the logical volume 2210 having a higher number of IO and a higher CPU usage rate is likely to remain in the acquisition target list.

Figure 17:
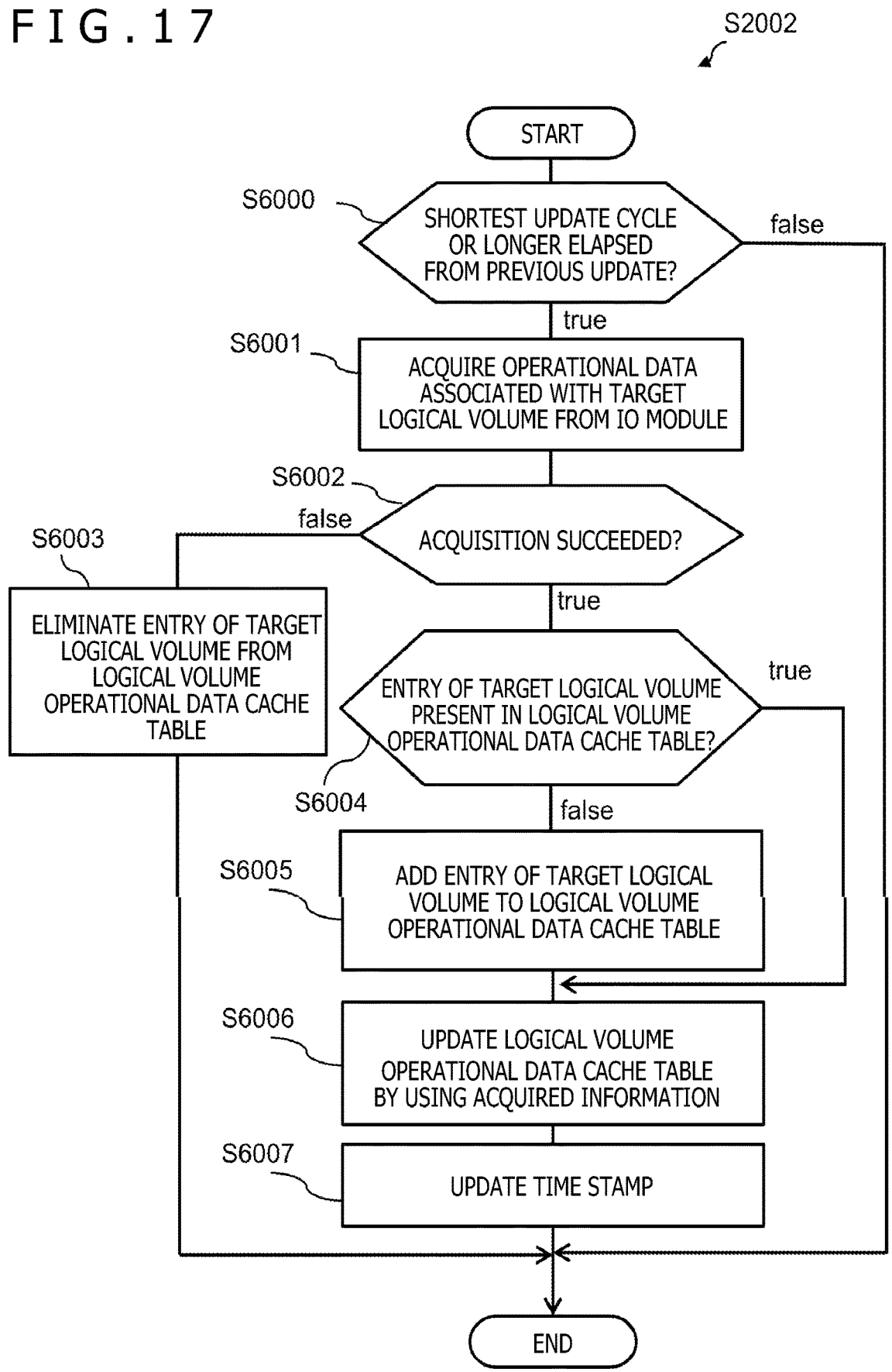
FIG. 17 is a flowchart presenting an example of an update process of operational data according to the first embodiment.

FIG. 17 is a flowchart presenting an example of a process which acquires the latest operational data 4200 from the IO module 2200 and updates the logical volume operational data cache table 5110. The management module 2100 may achieve this process by executing the management module control program 5000 in the memory 2102.

The management module 2100 determines whether or not a time of a shortest update cycle or longer has elapsed from previous cache update for the target logical volume 2210 (S6000). For example, the management module 2100 makes this determination by comparing a time stamp with a current time with reference to the logical volume operational data cache table 5110.

The management module 2100 proceeds to processing in step S6001 in a case where the time of the shortest update cycle or longer has elapsed from the previous cache update (S6000: true). The management module 2100 ends the present process in a case where the time of the shortest update cycle or longer has not elapsed from the previous cache update (S6000: false). In this manner, update of the cache in an excessively short cycle is prevented. For example, a cycle for updating the logical volume operational data table 4220 with use of the IO module 2200 or the like is set as the shortest update cycle. The shortest update cycle may be hard-coded in the program. Alternatively, a table for managing a setting of the shortest update cycle may be prepared in the memory 2102 of the management module 2100, and the administrator of the storage system may rewrite this setting as necessary.

The management module 2100 acquires the operational data 4200 associated with the target logical volume 2210 from the IO module 2200 (S6001). While not depicted in FIG. 17, the management module 2100 transmits an acquisition request for acquiring the operational data 4200 associated with the target logical volume 2210 to the IO module 2200. The IO module 2200 having received this request transfers an entry of the target logical volume 2210 from the logical volume operational data table 4220 to the management module 2100.

However, in a case where the logical volume 2210 is eliminated during execution of the determination process, for example, acquisition of the operational data 4200 may fail. Accordingly, the management module 2100 determines whether or not acquisition of the operational data 4200 has succeeded (S6002). In a case of succeeding in acquisition of the operational data 4200 (S6002: true), the management module 2100 proceeds to processing in step S6004. In a case of failing in acquisition of the operational data 4200 (S6002: false), the management module 2100 proceeds to processing in step S6003. The process proceeds to this processing because the target logical volume 2210 is determined to have been eliminated.

In step S6003, the management module 2100 eliminates an entry of the target logical volume 2210 from the logical volume operational data cache table 5110 (S6003), and the present process ends.

In step S6004, the management module 2100 determines whether or not an entry of the target logical volume 2210 is present in the logical volume operational data cache table 5110 (S6004). The management module 2100 proceeds to processing in step S6006 in a case where an entry of the target logical volume 2210 is present in the logical volume operational data cache table 5110 (S6004: true), or proceeds to processing in step S6005 in a case where no entry is present (S6004: false).

In step S6005, the management module 2100 adds an entry for storing the operational data 4200 associated with the target logical volume 2210 to the logical volume operational data cache table 5110 (S6005).

In step S6006, the management module 2100 updates an entry of the target logical volume 2210 in the logical volume operational data cache table 5110, by using the operational data 4200 acquired in step S6001 (S6006).

The management module 2100 updates a time stamp of the target logical volume 2210 in the logical volume operational data cache table 5110 to a current time (S6007). Thereafter, the management module 2100 ends the present process.

Second Embodiment

A second embodiment will hereinafter be described with reference to FIGS. 18 to 20.

According to the method described in the first embodiment, the analysis system 1001 designates a timeout, and acquires the largest possible number of pieces of the operational data 4200 associated with the logical volumes 2210 from the IO module 2200 within the timeout, to update the cache. This method is effective for a case where the analysis system 1001 frequently acquires the operational data 4200. On the other hand, in a case of a short timeout, the operational data 4200 to be updated is only a part of the entire logical volumes 2210. In this case, sufficient information accuracy is difficult to be secured. Described in the second embodiment will be a method for securing this information accuracy.

According to the present embodiment, acquisition of the operational data 4200 associated with the logical volume 2210 from the IO module 2200 continues until accuracy of the information contained in the logical volume operational data cache table 5110 of the management module 2100 reaches set accuracy, to secure sufficient information accuracy. While details will be described later, the management module 2100 acquires the operational data 4200 associated with the logical volume 2210 from the IO module 2200 in a descending order of a CPU usage rate of the corresponding logical volume 2210 until the CPU usage rate reaches a certain fixed criterion. For example, the management module 2100 acquires the operational data 4200 associated with the logical volume 2210 until an accumulated CPU usage rate reaches 90% of the entire CPU usage rate of the storage apparatus 2000. The operational data 4200 associated with the logical volume 2210 thus acquired is considered to indicate 90% of the entire tendency of the storage apparatus 2000.

Figure 18:
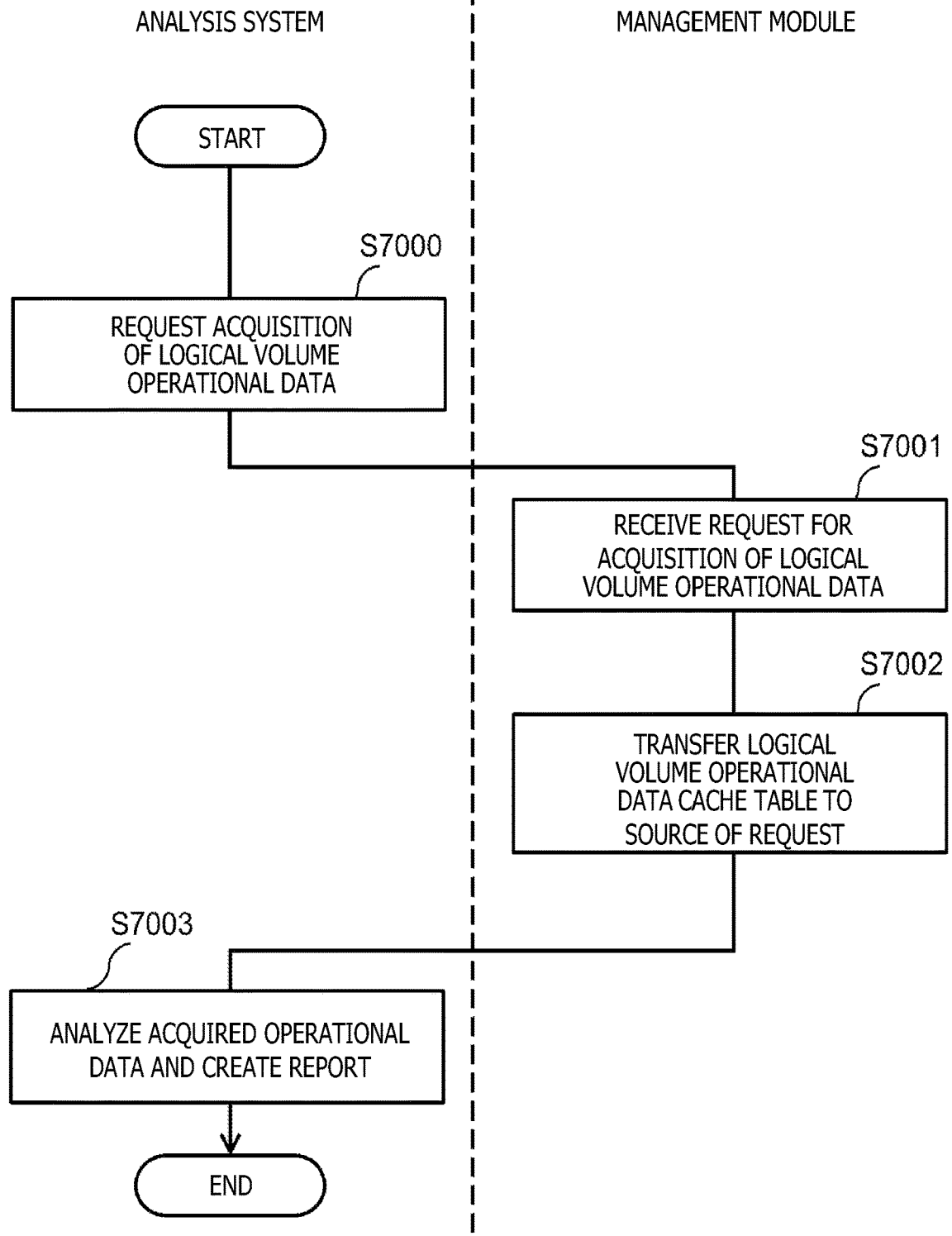
FIG. 18 is a flowchart presenting a processing example of operational data analysis performed by an analysis system according to a second embodiment.

FIG. 18 is a flowchart presenting an example of a process where the analysis system 1001 monitors and analyzes the operational data 4200 associated with the storage apparatus 2000 in the present embodiment. This process may be started for each fixed time interval in the cloud 1000 where the analysis system 1001 operates, in a computing environment prepared by a customer, or the like.

Processing executed by the analysis system 1001 in this process may operate in the cloud 1000 where the analysis system 1001 operates or in the computing environment. A program associated with the processing executed by the analysis system 1001 may be stored in a memory of the environment where the analysis system 1001 operates. Moreover, processing executed by the management module 2100 in this process may be achieved under the management module control program 5000 contained in the memory 2102 of the management module 2100 and executed by the management module 2100.

The analysis system 1001 issues an acquisition request for acquiring the operational data 4200 associated with the logical volume 2210 to the management module 2100 of the storage apparatus 2000 as an analysis target (S7000).

The management module 2100 of the storage apparatus 2000 receives the acquisition request for acquiring the operational data 4200 associated with the logical volume 2210 (S7001). Subsequently, the management module 2100 transfers the logical volume operational data cache table 5110 to the analysis system 1001 as the source of the request (S7002).

The analysis system 1001 having received the operational data 4200 associated with the requested logical volume 2210 carries out such analysis as performance anomaly detection, health check, failure prediction, performance trend analysis, and capacity trend analysis, for example, and creates an analysis result report by using the operational data 4200 thus acquired (S7003). For example, the administrator of the storage system regularly checks the created report to use the report for operation management of the storage system.

Note that, there is a possibility of transfer of the operational data 4200 having accuracy lower than the set accuracy, when the process executed in the background receives the acquisition request during update of the logical volume operational data cache table 5110 and transfers the logical volume operational data cache table 5110 that is under update to the analysis system 1001. For preventing this problem, a process for preparing two logical volume operational data cache tables 5110, i.e., a cache table for transfer to the analysis system 1001 and a cache table for update in the background, in a manner of double buffering and alternately switching these tables may be added. Specifically, the two logical volume operational data cache tables 5110 and a table for managing intended uses of the respective logical volume operational data cache tables 5110 (hereinafter referred to as an "intended use management table") may be prepared. In this case, the logical volume operational data cache table 5110 to be transferred to the analysis system 1001 may be selected and transferred to the analysis system 1001 with reference to the intended use management table in step S7002. The intended use management table may be updated as an extension of a background process for updating the logical volume operational data cache table 5110, when the background process is completed.

Further, the analysis system 1001 may designate information for identifying a generation of the operational data 4200 previously acquired, such as a previous acquisition time and a hash value of the operational data 4200 previously acquired (hereinafter referred to as "generation identification information"), at the time of issuing an acquisition request to the management module 2100. In this case, the management module 2100 may transfer information indicating no update instead of transferring the logical volume operational data cache table 5110, in a case of a determination that the operational data 4200 has not been updated since the previous acquisition request based on a comparison between the generation identification information and a generation of the current logical volume operational data cache table 5110.

The analysis system 1001 may perform the following process when determining that an intervention by the administrator of the storage system is necessary on the basis of detection of any abnormality or problem as a result of the analysis. Specifically, the analysis system 1001 may transmit a notice indicating occurrence of a problem to the administrator of the storage system by using an e-mail, an SMS, a messenger application, or the like.

While a communication process starts from a start point corresponding to the analysis system 1001 in FIG. 18, communication from the analysis system 1001 to the management module 2100 is limited in some cases from a viewpoint of security or the like. In such an environment, the management module 2100 may regularly inquire of the analysis system 1001 whether or not the operational data 4200 of the logical volume 2210 needs to be transferred.

According to the present embodiment, two types of background processes operate for updating the logical volume operational data table 4220. The first type is a process for updating respective pieces of the operational data 4200 associated with all of the logical volumes 2210 at a lowest possible frequency as depicted in FIG. 13. The second type is a process for updating the operational data 4200 associated with the logical volume 2210 on the basis of information accuracy, as depicted in FIG. 19.

Figure 19:
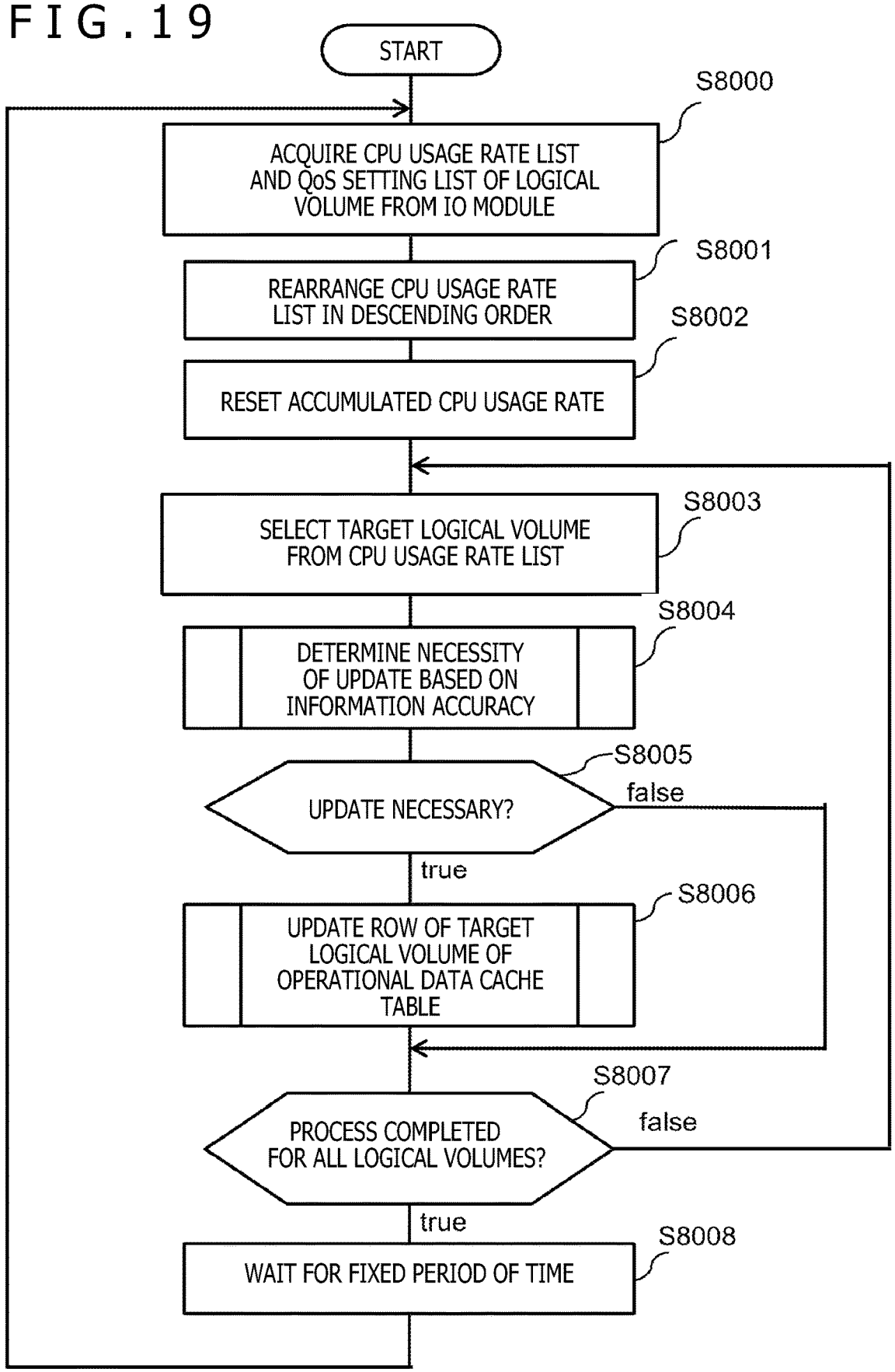
FIG. 19 is a flowchart presenting an example of a process for updating high-accuracy operational data according to the second embodiment.

FIG. 19 is a flowchart presenting an example of a process for updating the operational data 4200 associated with the logical volume 2210, on the basis of information accuracy. The management module 2100 may achieve this process by executing the management module control program 5000 in the memory 2102. Moreover, the management module 2100 may execute this process as a background process constantly or when appropriate.

The management module 2100 acquires a CPU usage rate list and presence or absence of a QoS setting list for all of the logical volumes 2210 from the IO module 2200 (S8000). While not depicted in FIG. 19, the management module 2100 transmits an acquisition request for acquiring the CPU usage rate and the QoS setting to the IO module 2200. The IO module 2200 having received this request extracts each piece of information associated with the presence or absence of the QoS setting and information associated with the CPU usage rate from the logical volume management table 4110 and the logical volume operational data table 4220, and transfers the extracted information to the management module 2100.

The management module 2100 rearranges the acquired CPU usage rate list such that the CPU usage rates are arranged in a descending order (S8001).

The management module 2100 resets a variable for calculating an accumulated CPU usage rate to 0 (S8002).

The management module 2100 selects the logical volume 2210 as a processing target (hereinafter referred to as a "target logical volume") one by one from the CPU usage rate list (S8003). The management module 2100 determines whether or not a cache needs to be updated for the target logical volume 2210 (S8004). Details of this determination process will be described with reference to FIG. 20.

The management module 2100 proceeds to processing in step S8006 in a case of a determination that the cache needs to be updated for the target logical volume 2210 (S8005: true), or proceeds to processing in step S8007 in a case of a determination that update is unnecessary (S8005: false).

In step S8006, the management module 2100 acquires the operational data 4200 associated with the target logical volume 2210 from the IO module 2200, and executes a process for updating the logical volume operational data cache table 5110 (S8006). This update process may be similar to the process described with reference to FIG. 17.

In step S8007, the management module 2100 performs a process for determining the necessity of update, and determines whether or not the update process is completed for all of the logical volumes 2210 in the CPU usage rate list (S8007). The management module 2100 proceeds to processing in step S8008 in a case where these processes are completed (S8007: true), or returns to the processing in step S8003 in a case where these processes are not completed (S8007: false).

In step S8008, the management module 2100 waits for a fixed period of time (S8008), and then returns to the processing in step S8000. This wait period is a frequency for updating the high-accuracy operational data 4200, and may be set to a shortest possible period. A setting of the wait period may be hard-coded in the program. Alternatively, a table for managing a setting of this wait period may be prepared in the memory 2102 of the management module 2100, and the administrator or the like of the storage system may rewrite this setting as necessary.

Figure 20:
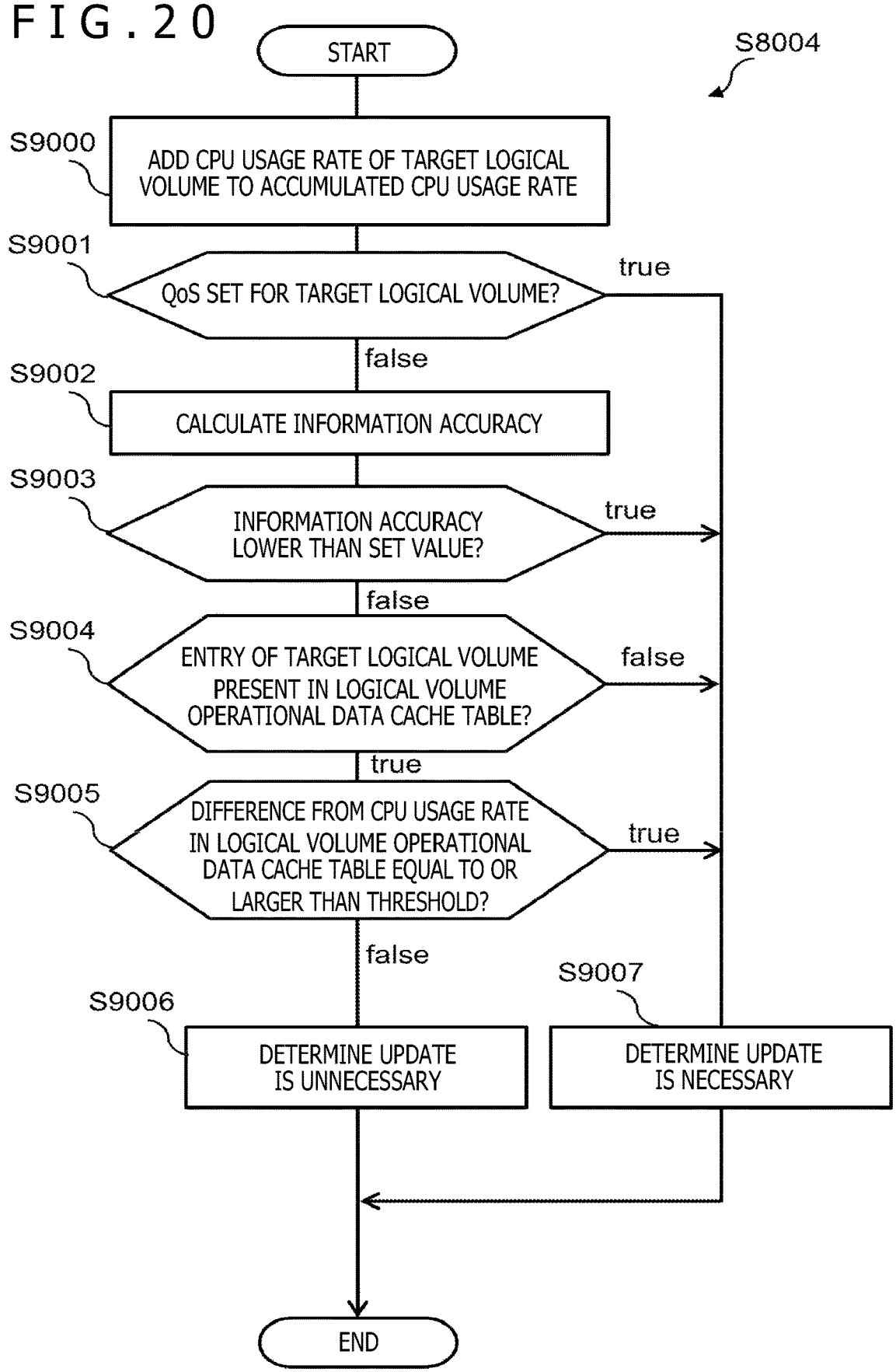
FIG. 20 is a flowchart presenting an example of a process for determining a target for which high-accuracy operational data is to be acquired according to the second embodiment.

FIG. 20 is a flowchart presenting an example of a process for determining whether or not update of the operational data 4200 associated with the target logical volume 2210 is necessary on the basis of information accuracy. The management module 2100 may achieve this process by executing the management module control program 5000 in the memory 2102.

The management module 2100 adds a CPU usage rate of the target logical volume 2210 to the variable of the accumulated CPU usage rate reset in step S8002 in FIG. 19 (S9000).

The management module 2100 determines whether or not a QoS has been set for the target logical volume 2210 with reference to a QoS setting list acquired in step S8000 (S9001). The management module 2100 proceeds to processing in step S9007 in a case where a QoS has been set for the target logical volume 2210 (S9001: true). The management module 2100 proceeds to processing in step S9002 in a case where a QoS has not been set for the target logical volume 2210 (S9001: false). The logical volume 2210 for which a QoS has been set is generally considered to have severe performance requirements. Accordingly, the cache is updated for the logical volume 2210 having severe performance requirements according to this determination process, regardless of information accuracy.

In step S9002, the management module 2100 calculates information accuracy of the current logical volume operational data cache table 5110 from the accumulated CPU usage rate (S9002). For example, the management module 2100 calculates a proportion of the accumulated CPU usage rate in a current total CPU usage rate with reference to a total CPU usage rate of the system operational data table 4210, as information accuracy. This calculation is achieved by transmission of an acquisition request for acquiring the total CPU usage rate from the management module 2100 to the IO module 2200 and transfer of information indicating the total CPU usage rate of the system operational data table 4210 from the IO module 2200 having received the request to the management module 2100.

The management module 2100 determines whether or not the calculated information accuracy is lower than set information accuracy (S9003). The management module 2100 proceeds to processing in step S9007 in a case where the calculated information accuracy is lower than the set information accuracy (S9003: true), or proceeds to processing in step S9004 in a case where the calculated information accuracy is equal to or higher than the set information accuracy (S9003: false).

In step S9004, the management module 2100 determines whether or not an entry of the target logical volume 2210 is present in the logical volume operational data cache table 5110 (S9004). For example, the management module 2100 makes this determination by searching ID of the target logical volume 2210 from the logical volume operational data cache table 5110.

The management module 2100 proceeds to processing in step S9007 in a case where no entry of the target logical volume 2210 is present in the logical volume operational data cache table 5110 (S9004: false). The management module 2100 proceeds to processing in step S9005 in a case where an entry of the target logical volume 2210 is present in the logical volume operational data cache table 5110 (S9004: true). The presence or absence of an entry is determined here because even low-accuracy information becomes difficult to be transferred in a case of no entry in the logical volume operational data cache table 5110.

In step S9005, the management module 2100 calculates a difference between the CPU usage rate of the target logical volume 2210 stored in the logical volume operational data cache table 5110 and the latest CPU usage rate acquired in step S8000, and determines whether or not the difference is equal to or larger than a threshold (S9005). The management module 2100 proceeds to processing in step S9007 in a case where the difference is equal to or larger than the threshold (S9005: true), or proceeds to processing in step S9006 in a case where the difference is smaller than the threshold (S9005: false). In this manner, the logical volume 2210 where a phenomenon which the administrator of the storage system should be notified of may be caused as a result of a considerable change in the CPU usage rate is updated regardless of information accuracy. Accordingly, overlooked anomaly detection by the analysis system 1001 or the like can be reduced.

In step S9006, the management module 2100 determines that the logical volume 2210 having reached step S9006 need not be updated (S9006), and returns a result of this determination to the process corresponding to the source of the call.

In step S9007, the management module 2100 determines that the logical volume 2210 having reached step S9007 needs to be updated (S9007), and returns a result of this determination to the process corresponding to the source of the call.

The management module 2100 rearranges the logical volumes 2210 in a descending order of the CPU usage rate in step S8001 to sequentially make determination of the present process from the logical volume 2210 having the highest CPU usage rate and the largest number of IO. In other words, processing is sequentially performed in a descending order of contribution to the information accuracy by the logical volume 2210. The amount of IO issued by the host 3000 generally differs for each of the logical volumes 2210, and is often biased to some of the logical volumes 2210. Accordingly, the set information accuracy is highly likely to be achievable with use of a considerably smaller number of volumes than the number of the logical volumes by performing the determination process in a descending order of the CPU usage rate.

While the management module 2100 calculates the information accuracy with use of the CPU usage rate in the present embodiment, the information accuracy may be calculated using other information. For example, the management module 2100 may calculate the information accuracy by using IOPS or a transfer speed of the logical volume 2210, or a combination of these. As described above, the information accuracy is calculated on the basis of the CPU usage rate in the present embodiment. Accordingly, the present determination process is sequentially performed from the logical volume 2210 having the highest CPU usage rate and the highest degree of contribution to the information accuracy. In a case of calculation of the information accuracy with use of items other than the CPU usage rate, the management module 2100 may rearrange the logical volumes 2210 in a descending order of contribution to the information accuracy according to the type of the information in step S8001.

Note that a setting of the information accuracy in step S9003 may be hard-coded in the program. Alternatively, a table for managing a setting of the information accuracy in step S9003 may be prepared in the memory 2102 of the management module 2100, and the administrator or the like of the storage system may rewrite the setting as necessary.

The present disclosure includes the following matters. However, matters included in the present disclosure are not limited to the following matters.

The storage apparatus 2000 according to the present disclosure is directed to a storage apparatus including a processor and a memory. The processor provides a plurality of logical volumes each allowing input and output of data, and processes each data input to and output from a storage device via the logical volume 2210. The processor acquires the operational data 4200 associated with each of the plurality of logical volumes 2210, and transmits the acquired operational data 4200 to a source of a operational data request. The processor adjusts, for each of the logical volumes 2210, accuracy of the operational data 4200 to be acquired from each of the logical volumes 2210, according to a status of each of the logical volumes 2210.

According to this configuration, the operational data 4200 associated with each of the logical volumes 2210 is acquired with accuracy adjusted for each of the logical volumes 2210 according to the status of each of the logical volumes 2210, and is transferred to the source of the operational data request. Accordingly, changes in the data volume to be transmitted can be reduced, and time required for the data transfer can be maintained to a fixed period of time or shorter. For example, even when a storage resource which is a monitoring target and provided for the host 3000 increases, the data volume can be reduced to a fixed amount or smaller by appropriate adjustment of the accuracy while sufficient accuracy of data to be transferred to the analysis system 1001 is secured.

The storage apparatus 2000 may adjust accuracy so as to transmit the operational data 4200 in a cycle required from the source of the operational data request. According to this configuration, the operational data 4200 can be transmitted in the cycle required from the source of the operational data request.

The storage apparatus 2000 may manage a resource amount associated with the processor and used by each of the logical volumes 2210, and may adjust accuracy of acquisition of the operational data 4200, on the basis of the resource amount associated with the processor and used by each of the logical volumes 2210. According to this configuration, the data volume to be transmitted can be reduced on the basis of the resource amount associated with the processor and used by each of the logical volumes 2210.

The storage apparatus 2000 may manage the number of hosts each having a path established for the corresponding logical volume 2210, and exclude the logical volume 2210 for which the path of the host is not established from targets for which the operational data 4200 is to be acquired. According to this configuration, the data volume to be transmitted can be reduced on the basis of the number of the hosts each having a path established for the corresponding logical volume 2210.

The storage apparatus 2000 may manage a QoS setting set for each of the logical volumes 2210, and set the logical volume 2210 for which the QoS is set as a target for which the operational data 4200 is to be acquired highly accurately. According to this configuration, the operational data 4200 associated with the logical volume 2210 for which the QoS is set can be acquired highly accurately.

The storage apparatus 2000 may manage a creation date and time at which each of the logical volumes 2210 is created and a setting change date and time at which setting of each of the logical volumes 2210 is changed, and may set the logical volume 2210 of which the number of elapsed days from the creation date and time or the setting change date and time is small as a target for which the operational data 4200 is to be acquired highly accurately. According to this configuration, the operational data 4200 associated with the logical volume 2210 of which the number of elapsed days from the creation date and time or the setting change date and time is small can be acquired highly accurately.

The storage apparatus 2000 may determine the number of logical volumes 2210 for each of which the operational data 4200 is to be highly accurately acquired, on the basis of the cycle requested from the source of the operational data request, and determine the logical volume 2210 for which the operational data 4200 is to be highly accurately acquired, on the basis of the number of the determined logical volumes 2210 and the status of each of the logical volumes 2210. According to this configuration, changes in the data volume to be transmitted can be reduced, and data transfer in a desired cycle can be achieved.

The storage apparatus 2000 may add a resource use amount in a descending order of the resource amount associated with the processor and used by the logical volume 2210 until the resource use amount becomes a predetermined amount, and designate the logical volume 2210 corresponding to the added use amount as the logical volume 2210 for which the operational data 4200 is to be highly accurately acquired. According to this configuration, the operational data 4200 associated with the logical volume 2210 corresponding to a large use resource amount associated with the processor is designated as an acquisition target, and reduction of the data volume to be transmitted is achieved.

The storage apparatus 2000 may include the management processing unit 2100 that includes the first processor 2101 and the first memory 2102. The first processor 2101 acquires and transmits the operational data 4200, and adjusts acquisition accuracy. The storage apparatus 2000 may further include the input/output processing unit 2200 that includes the second processor 2201 and the second memory 2202. The second processor 2201 provides the logical volumes 2210 and processes the data. According to this configuration, the input/output processing unit 2200 and the management processing unit 2100 are separately formed. Accordingly, the operational data 4200 associated with the logical volumes 2210 can be acquired with accuracy more reflecting the statuses of the logical volumes 2210.

The input/output processing unit 2200 may store, in the second memory 2202, the operational data 4200 associated with each of the logical volumes 2210. The management processing unit 2100 may store, in the first memory 2102, the operational data 4200 stored in the second memory 2202, and transmit the operational data 4200 to the source of the operational data request. The management processing unit 2100 may adjust the accuracy by changing a cycle for shifting the operational data 4200 from the second memory 2202 to the first memory 2102 for each of the logical volumes 2210, on the basis of a cycle requested from the source of the operational data request and the status of the corresponding logical volume 2210. According to this configuration, the adjustment is made using the cycle for shifting the operational data 4200 from the first memory 2102 to the second memory 2202. Accordingly, changes of the time required for transferring the operational data 4200 can be reduced.

The input/output processing unit 2200 may manage a resource amount associated with the processor and used by each of the logical volumes 2210. The management processing unit 2100 may acquire resource amount information associated with the processor and used by each of the logical volumes 2210 from the input/output processing unit 2200. The management processing unit 2100 may shift, in a short cycle, the operational data 4200 associated with the logical volume 2210 that uses a large resource amount associated with the processor. According to this configuration, the operational data 4200 associated with the logical volume 2210 corresponding to a large resource use amount associated with the processor can be acquired highly accurately.

The main embodiments of the present invention described above have been presented only by way of example for explaining the present invention. It is therefore not intended that the scope of the present invention should be limited only to these embodiments. All the described configurations are not necessarily required. In addition, a part of a configuration of a certain example may be replaced with or added to a configuration of another example. Similarly, a partial configuration of respective examples may be modified or eliminated as necessary.

What is claimed is:
1. A storage apparatus comprising:
a processor; and
a memory, wherein the processor provides a plurality of logical volumes each allowing input and output of data, and processes each data input to and output from a storage device via corresponding one of the logical volumes, the processor acquires operational data associated with each of the plurality of logical volumes, and transmits the acquired operational data to a source of an operational data request, and the processor adjusts, for each of the logical volumes, accuracy of the operational data to be acquired from each of the logical volumes, according to a status of each of the logical volumes, wherein a creation date and time at which each of the logical volumes is created and a setting change date and time at which setting of each of the logical volumes is changed are managed, and the logical volume of which the number of elapsed days from the creation date and time or the setting change date and time is small is a target for which the operational data is to be acquired highly accurately.

2. The storage apparatus according to claim 1, wherein the accuracy is so adjusted as to transmit the operational data in a cycle required from the source of the operational data request.

3. The storage apparatus according to claim 2, wherein the number of logical volumes for each of which the operational data is to be highly accurately acquired is determined on a basis of the cycle requested from the source of the operational data request, and the logical volume for which the operational data is to be highly accurately acquired is determined on a basis of the number of the determined logical volumes and the status of each of the logical volumes.

4. The storage apparatus according to claim 3, wherein a resource use amount is added in a descending order of the resource amount associated with the processor and used by the logical volume until the resource use amount becomes a predetermined amount, and the logical volume corresponding to the added use amount is designated as the logical volume for which the operational data is to be highly accurately acquired.

5. The storage apparatus according to claim 1, wherein a resource amount associated with the processor and used by each of the logical volumes is managed, and accuracy of acquisition of the operational data is adjusted on a basis of the resource amount associated with the processor and used by each of the logical volumes.

6. The storage apparatus according to claim 1, wherein the number of hosts each having a path established for the corresponding logical volume is managed, and the logical volume for which the path of the host is not established is excluded from targets for which the operational data is to be acquired.

7. The storage apparatus according to claim 1, wherein setting of a quality of service set for each of the logical volumes is managed, and the logical volume for which the quality of service is set is a target for which the operational data is highly accurately acquired.

8. The storage apparatus according to claim 1, comprising:

a management processing unit that includes a first processor and a first memory, the first processor acquiring and transmitting the operational data and adjusting acquisition accuracy; and an input/output processing unit that includes a second processor and a second memory, the second processor providing the logical volumes and processing the data.

9. A storage apparatus comprising:

a processor; and a memory, wherein the processor provides a plurality of logical volumes each allowing input and output of data, and processes each data input to and output from a storage device via corresponding one of the logical volumes, the processor acquires operational data associated with each of the plurality of logical volumes, and transmits the acquired operational data to a source of a operational data request, the processor adjusts, for each of the logical volumes, accuracy of the operational data to be acquired from each of the logical volumes, according to a status of each of the logical volumes, a management processing unit that includes a first processor and a first memory, the first processor acquiring and transmitting the operational data and adjusting acquisition accuracy; and an input/output processing unit that includes a second processor and a second memory, the second processor providing the logical volumes and processing the data wherein the input/output processing unit stores, in the second memory, the operational data associated with each of the logical volumes, the management processing unit stores, in the first memory, the operational data stored in the second memory, and transmits the operational data to the source of the operational data request, and the management processing unit adjusts the accuracy by changing a cycle for shifting the operational data from the second memory to the first memory for each of the logical volumes, on a basis of a cycle requested from the source of the operational data request and the status of the corresponding logical volume.

10. The storage apparatus according to claim 9, wherein the input/output processing unit manages a resource amount associated with the processor and used by each of the logical volumes, the management processing unit acquires resource amount information associated with the processor and used by each of the logical volumes from the input/output processing unit, and the management processing unit shifts, in a short cycle, the operational data associated with the logical volume that uses a large resource amount associated with the processor.

11. A method for management process performed by a storage apparatus that includes a processor and a memory, wherein the processor provides a plurality of logical volumes each allowing input and output of data, and processes each data input to and output from a storage device via the logical volume, the processor acquires operational data associated with each of the plurality of logical volumes, and transmits the acquired operational data to a source of an operational data request, and the processor adjusts, for each of the logical volume, accuracy of the operational data to be acquired from each of the logical volumes, according to a status of each of the logical volumes, a creation date and time at which each of the logical volumes is created by the processor and a setting change date and time at which setting of each of the logical volumes is changed are managed by the processor, and the logical volume of which the number of elapsed days from the creation date and time or the setting change date and time is small is a target for which the operational data is to be acquired highly accurately by the processor.

* * * * *